US012706715B2

(12) United States Patent
Gao et al.

(10) Patent No.: US 12,706,715 B2
(45) Date of Patent: Aug. 11, 2026

(54) SOUNDING REFERENCE SIGNAL TRANSMISSION TECHNIQUES

(71) Applicant: ZTE Corporation, Shenzhen (CN)

(72) Inventors: Bo Gao, Shenzhen (CN); Zhaohua Lu, Shenzhen (CN); Shujuan Zhang, Shenzhen (CN); Meng Mei, Shenzhen (CN); Yang Zhang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 325 days.

(21) Appl. No.: 18/522,085

(22) Filed: Nov. 28, 2023

(65) Prior Publication Data

US 2024/0187184 A1 Jun. 6, 2024

Related U.S. Application Data

(63) Continuation of application No. PCT/CN2022/079185, filed on Mar. 4, 2022.

(51) Int. Cl.
*H04L 5/00* (2006.01)

(52) U.S. Cl.
CPC .......... *H04L 5/0051* (2013.01); *H04L 5/0012* (2013.01)

(58) Field of Classification Search
None
See application file for complete search history.

(56) References Cited

U.S. PATENT DOCUMENTS

| | | | | |
|---|---|---|---|---|
| 8,953,483 | B2 * | 2/2015 | Noh | H04L 5/0094 370/252 |
| 2016/0277065 | A1 | 9/2016 | Xie et al. | |
| 2017/0264402 | A1 * | 9/2017 | Papasakellariou | H04W 74/006 |
| 2020/0092055 | A1 | 3/2020 | Choi et al. | |
| 2020/0295973 | A1 | 9/2020 | Choi et al. | |
| 2021/0226821 | A1 | 7/2021 | Liu et al. | |
| 2021/0314982 | A1 | 10/2021 | Panteleev et al. | |
| 2023/0238743 | A1 * | 7/2023 | Tanaka | H01R 13/40 439/108 |
| 2023/0275737 | A1 * | 8/2023 | Chen | H04L 5/0048 370/329 |
| 2024/0106596 | A1 * | 3/2024 | Yao | H04L 5/0048 |

FOREIGN PATENT DOCUMENTS

| | | |
|---|---|---|
| CN | 112534759 A | 3/2021 |
| CN | 112544051 A | 3/2021 |
| CN | 113366900 A | 9/2021 |
| WO | 2021012981 A1 | 1/2021 |

(Continued)

OTHER PUBLICATIONS

Huawei et al., "NR enhancements for DL MIMO," 3GPP TSG RAN Meeting #92-e, RWS-210437, Electronic Meeting, Jun. 28-Jul. 2, 2021, 14 pages.

(Continued)

*Primary Examiner* — Anh Vu H Ly
(74) *Attorney, Agent, or Firm* — Perkins Coie

(57) ABSTRACT

Techniques are described to transmit sounding reference signal (SRS). An example wireless communication method includes transmitting, by a communication device, a sounding reference signal (SRS) using one or more resource elements, where the SRS is determined by the communication device according to one or more parameters.

16 Claims, 9 Drawing Sheets

(56) References Cited

FOREIGN PATENT DOCUMENTS

| WO | 2023164913 A1 | 9/2023 |
|---|---|---|

OTHER PUBLICATIONS

Lenovo et al., "Enhancements on SRS," 3GPP TSG RAN WG1 #107-e, R1-2110936, e-Meeting, Nov. 11-19, 2021, 12 pages.
Ericsson, "Remaining Issues for SRS," 3GPP TSG-RAN WG1 Meeting 106-bis-e, Tdoc R1-2110121, e-Meeting, Oct. 11-19, 2021, 16 pages.
Futurewei, "Enhancements on SRS flexibility, coverage and capacity," 3GPP TSG RAN WG1 Meeting #106bis-e, R1-2108794, e-Meeting, Oct. 11-19, 2021, 29 pages.
Futurewei, "Proposal for distributed cooperative MIMO in Rel-18," 3GPP TSG RAN Meeting #93e, RP-212456, Sep. 13-17, 2021, 7 pages.
Huawei, "Enhancements on SRS in Rel-17," 3GPP TSG RAN WG1 Meeting #106-e, R1-2106468, e-Meeting, Aug. 16-27, 2021, 16 pages.
Lenovo et al., "Enhancements on SRS," 3GPP TSG RAN WG1 #104-e, R1-2100277, e-Meeting, Jan. 25-Feb. 5, 2021, 10 pages.
International Search Report in International Application No. PCT/CN2022/079185, mailed on Jun. 24, 2022, 6 pages.
Extended European Search Report from European Application No. 22929361.8, Mail Date: Jul. 3, 2024, 7 pages.
Intel Corporation "Discussion and Decision," 3GPP TSG RAN WG1 Meeting 91, Reno, USA, Nov. 27 to Dec. 1, 2017, R1-1720078.
Office Action from Canadian Application No. 3,222,539 dated May 13, 2025, 6 pages.
Office Action from Korean Application No. 10-2023-7045221 dated Nov. 27, 2025, 8 pages with English summary.
3GPP TS 38.211 V16.8.0, "Physical channels and modulation (Release 16)," 3rd Generation Partnership Project; Technical Specification Group Radio Access Network; NR; Dec. 2021, 134 pages.

* cited by examiner

Figure 8:
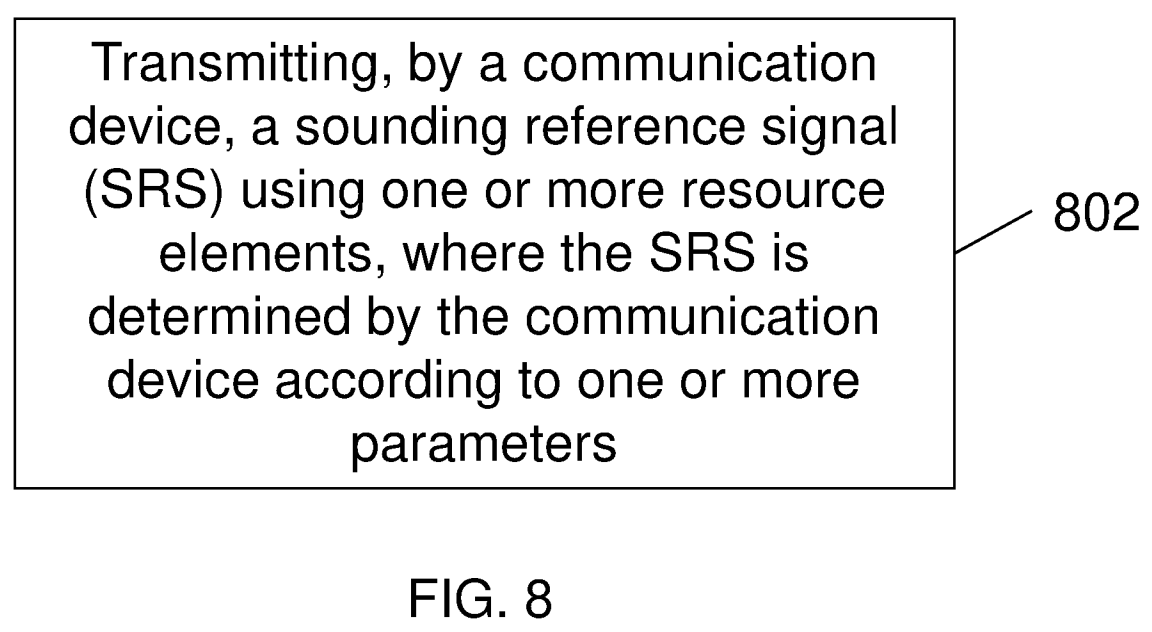

Transmitting, by a communication device, a sounding reference signal (SRS) using one or more resource elements, where the SRS is determined by the communication device according to one or more parameters

SOUNDING REFERENCE SIGNAL TRANSMISSION TECHNIQUES

CROSS-REFERENCE TO RELATED APPLICATIONS

This application is a continuation of International Patent Application No. PCT/CN2022/079185, filed on Mar. 4, 2022, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for determining and/or transmitting SRS sequence.

An example wireless communication method includes transmitting, by a communication device, a sounding reference signal (SRS) using one or more resource elements, where the SRS is determined by the communication device according to one or more parameters.

In some embodiments, a content of the one or more resource elements is determined according to an orthogonal cover code (OCC) function, and each element of the OCC function is determined according to a time-domain index and/or a frequency domain index of the one or more resource elements. In some embodiments, a value for the OCC function is indicated by an OCC parameter, and the OCC parameter is included in a radio resource control (RRC) signaling, is activated via a medium access control-control element (MAC-CE) signaling, or is associated with a beam state. In some embodiments, the OCC parameter applies to one SRS resource or one SRS resource set, or one or more OCC parameters for each SRS resource in a SRS resource are the same, or the OCC parameter is configured by a parameter combination that comprises at least a repetition factor that indicates a number of repetitions of the SRS. In some embodiments, the OCC function applies to resource elements with a same frequency location and corresponding to a plurality of repetitions of the SRS, the OCC function is determined according to a group index that comprises at least one of resource element index, resource block index, or index of a group of one or more resource elements or one or more resource blocks, or a spatial relation or QCL-TypeD is precluded as being applicable.

In some embodiments, the OCC function is disabled in response to a repetition factor being not configured. In some embodiments, an OCC parameter is determined according to a number of symbols of the SRS in response to a repetition factor being not configured. In some embodiments, a transmission power for the SRS within one repetition of the SRS or one OCC function is kept unchanged, the transmission power for the SRS is determined per repetition or per OCC function, a power control parameter associated with the SRS within one SRS repetition or one OCC function is kept unchanged, or a transmission occasion associated with the SRS is determined per SRS repetition or per OCC function. In some embodiments, the transmitting of the SRS is performed according to a partial frequency scaling factor, the partial frequency scaling factor is associated with a frequency hopping pattern from a plurality of patterns, and each of the plurality of patterns indicates a list of one or more frequency offsets. In some embodiments, a step for selecting elements in an order from the list of one or more frequency offsets is 1, or the step for selecting elements in an order from the list of one or more frequency offsets is determined according to the partial frequency scaling factor or is configured.

In some embodiments, in response to the partial frequency scaling factor being equal to 8, and the plurality of patterns include any one or more of: a first pattern with frequency offsets [0, 4, 1, 5, 2, 6, 3, 7], a second pattern with frequency offsets [0, 1, 2, 3, 4, 5, 6, 7], and/or a third pattern with frequency offsets [0, 2, 4, 6, 1, 3, 5, 7]. In some embodiments, in response to the partial frequency scaling factor being equal to 4, and the plurality of patterns include any one or more of: a first pattern with frequency offsets [0, 2, 1, 3], a second pattern with frequency offsets [0, 1, 3, 2], and/or a third pattern with frequency offsets [0, 1, 2, 3]. In some embodiments, the frequency hopping pattern is based on a SRS counter that indicates an index associated with a transmission of the SRS, a number of slots, a symbol index of a symbol associated with the SRS, or a number of symbols associated with the SRS.

In some embodiments, the method further comprises receiving, by the communication device, a radio resource control (RRC) signaling that indicates a mode that indicates both SRS sequence hopping and group hopping. In some embodiments, an initialization value for sequence group and sequence number is determined or configured individually. In some embodiments, an offset for an initialization value for sequence group or sequence number is configured or is predefined. In some embodiments, an initialization value for the SRS is determined according to a SRS related time unit. In some embodiments, the SRS related time unit includes an SRS counter that indicates an index associated with a transmission of the SRS, a number of slots, a symbol index of a symbol associated with the SRS, or a number of symbols associated with the SRS.

In some embodiments, any one or more of following parameters associated with the SRS is determined based on the SRS related time unit: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset. In some embodiments, a sequence group and/or a sequence number for the SRS are determined according to a scaling factor or an offset.

In some embodiments, the scaling factor or the offset are configured per component carrier (CC), per bandwidth part (BWP), per SRS resource set, or SRS resource, the scaling factor or the offset are determined according to beam state, physical cell index (PCI), resource group index, or CORESET pool index, or one or more scaling factors or one or more offsets for one or more SRS resources in a CC, in a BWP or a SRS resource set is the same. In some embodiments, a maximum number of SRS sequence identifier is configured to be more than 1023, or a range of SRS sequence identifier is from 0 to 65535 with a step of 1. In some embodiments, the method further comprises receiving a downlink control information (DCI) signaling or a medium access control-control element (MAC-CE) signaling that is associated with the one or more parameters that include any one or more of: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset. In some embodiments, at least one first parameter of the one or more parameters is selected from a group of one or more first parameters, wherein the group of the one or more first parameters is activated by a MAC-CE or configured by a radio resource control (RRC), or where the one or more parameters is selected from a plurality of the one or more parameters, wherein the plurality of group of the one or more parameters is activated by a MAC-CE or configured by a radio resource control (RRC).

In some embodiments, the initialization value comprises any one or more of a first initialization value for a sequence group and/or a second initialization value for a sequence number. In some embodiments, the offset for the initialization value comprises any one or more of a first offset for the initialization value for a sequence group and a second offset for the initialization value for a sequence number. In some embodiments, the communication device applies the one or more parameters associated with a beam state in response to the beam state being applied a number of time units after an acknowledgement is transmitted by the communication device. In some embodiments, the one or more parameters corresponding to each beam state of a plurality of beam states are applied by communication device in response to the communication device receiving a command that indicates the plurality of beam states.

Another example wireless communication method includes receiving, by a network device, a sounding reference signal (SRS) using one or more resource elements, where the SRS is determined according to one or more parameters.

In some embodiments, a content of the one or more resource elements is according to an orthogonal cover code (OCC) function, and each element of the OCC function is according to a time-domain index and/or a frequency domain index of the one or more resource elements. In some embodiments, wherein a value for the OCC function is indicated by an OCC parameter, and wherein the OCC parameter is included in a radio resource control (RRC) signaling, is activated via a medium access control-control element (MAC-CE) signaling, or is associated with a beam state. In some embodiments, the OCC parameter applies to one SRS resource or one SRS resource set, or one or more OCC parameters for each SRS resource in a SRS resource are the same, or the OCC parameter is configured by a parameter combination that comprises at least a repetition factor that indicates a number of repetitions of the SRS. In some embodiments, the OCC function applies to resource elements with a same frequency location and corresponding to a plurality of repetitions of the SRS, the OCC function is determined according to a group index that comprises at least one of resource element index, resource block index, or index of a group of one or more resource elements or one or more resource blocks, or a spatial relation or QCL-TypeD is precluded as being applicable.

In some embodiments, the OCC function is disabled in response to a repetition factor being not configured. In some embodiments, an OCC parameter is determined according to a number of symbols of the SRS in response to a repetition factor being not configured. In some embodiments, a transmission power for the SRS within one repetition of the SRS or one OCC function is kept unchanged, the transmission power for the SRS is determined per repetition or per OCC function, a power control parameter associated with the SRS within one SRS repetition or one OCC function is kept unchanged, or a transmission occasion associated with the SRS is determined per SRS repetition or per OCC function. In some embodiments, the receiving of the SRS is according to a partial frequency scaling factor, the partial frequency scaling factor is associated with a frequency hopping pattern from a plurality of patterns, and each of the plurality of patterns indicates a list of one or more frequency offsets. In some embodiments, a step for selecting elements in an order from the list of one or more frequency offsets is 1, or the step for selecting elements in an order from the list of one or more frequency offsets is according to the partial frequency scaling factor or is configured.

In some embodiments, in response to the partial frequency scaling factor being equal to 8, and the plurality of patterns include any one or more of: a first pattern with frequency offsets [0, 4, 1, 5, 2, 6, 3, 7], a second pattern with frequency offsets [0, 1, 2, 3, 4, 5, 6, 7], and/or a third pattern with frequency offsets [0, 2, 4, 6, 1, 3, 5, 7]. In some embodiments, in response to the partial frequency scaling factor being equal to 4, and the plurality of patterns include any one or more of: a first pattern with frequency offsets [0, 2, 1, 3], a second pattern with frequency offsets [0, 1, 3, 2], and/or a third pattern with frequency offsets [0, 1, 2, 3]. In some embodiments, the frequency hopping pattern is based on a SRS counter that indicates an index associated with a transmission of the SRS, a number of slots, a symbol index of a symbol associated with the SRS, or a number of symbols associated with the SRS. In some embodiments, the method further comprises transmitting, by the network device, a radio resource control (RRC) signaling that indicates a mode that indicates both SRS sequence hopping and group hopping.

In some embodiments, an initialization value for sequence group and sequence number is determined or configured individually. In some embodiments, an offset for an initialization value for sequence group or sequence number is configured or is predefined. In some embodiments, an initialization value for the SRS is determined according to a SRS related time unit. In some embodiments, the SRS related time unit includes an SRS counter that indicates an index associated with a transmission of the SRS, a number of slots, a symbol index of a symbol associated with the SRS, or a number of symbols associated with the SRS. In some embodiments, any one or more of following parameters associated with the SRS is determined based on the SRS related time unit: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset.

In some embodiments, a sequence group and/or a sequence number for the SRS are determined according to a scaling factor or an offset. In some embodiments, the scaling factor or the offset are configured per component carrier (CC), per bandwidth part (BWP), per SRS resource set, or SRS resource, the scaling factor or the offset are determined according to beam state, physical cell index (PCI), resource group index, or CORESET pool index, or one or more scaling factors or one or more offsets for one or more SRS resources in a CC, in a BWP or a SRS resource set is the same. In some embodiments, a maximum number of SRS sequence identifier is configured to be more than 1023, or a range of SRS sequence identifier is from 0 to 65535 with a step of 1.

In some embodiments, the method further comprises transmitting a downlink control information (DCI) signaling or a medium access control-control element (MAC-CE) signaling that is associated with the one or more parameters that include any one or more of: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset. In some embodiments, at least one first parameter of the one or more parameters is selected from a group of one or more first parameters, wherein the group of the one or more first parameters is activated by a MAC-CE or configured by a radio resource control (RRC), or where the one or more parameters is selected from a plurality of the one or more parameters, wherein the plurality of group of the one or more parameters is activated by a MAC-CE or configured by a radio resource control (RRC). In some embodiments, the initialization value comprises any one or more of a first initialization value for a sequence group and/or a second initialization value for a sequence number. In some embodiments, the offset for the initialization value comprises any one or more of a first offset for the initialization value for a sequence group and a second offset for the initialization value for a sequence number.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 8 shows an exemplary flowchart for transmitting SRS.

FIG. 9 shows an exemplary flowchart for receiving SRS.

DETAILED DESCRIPTION

Figure 1:
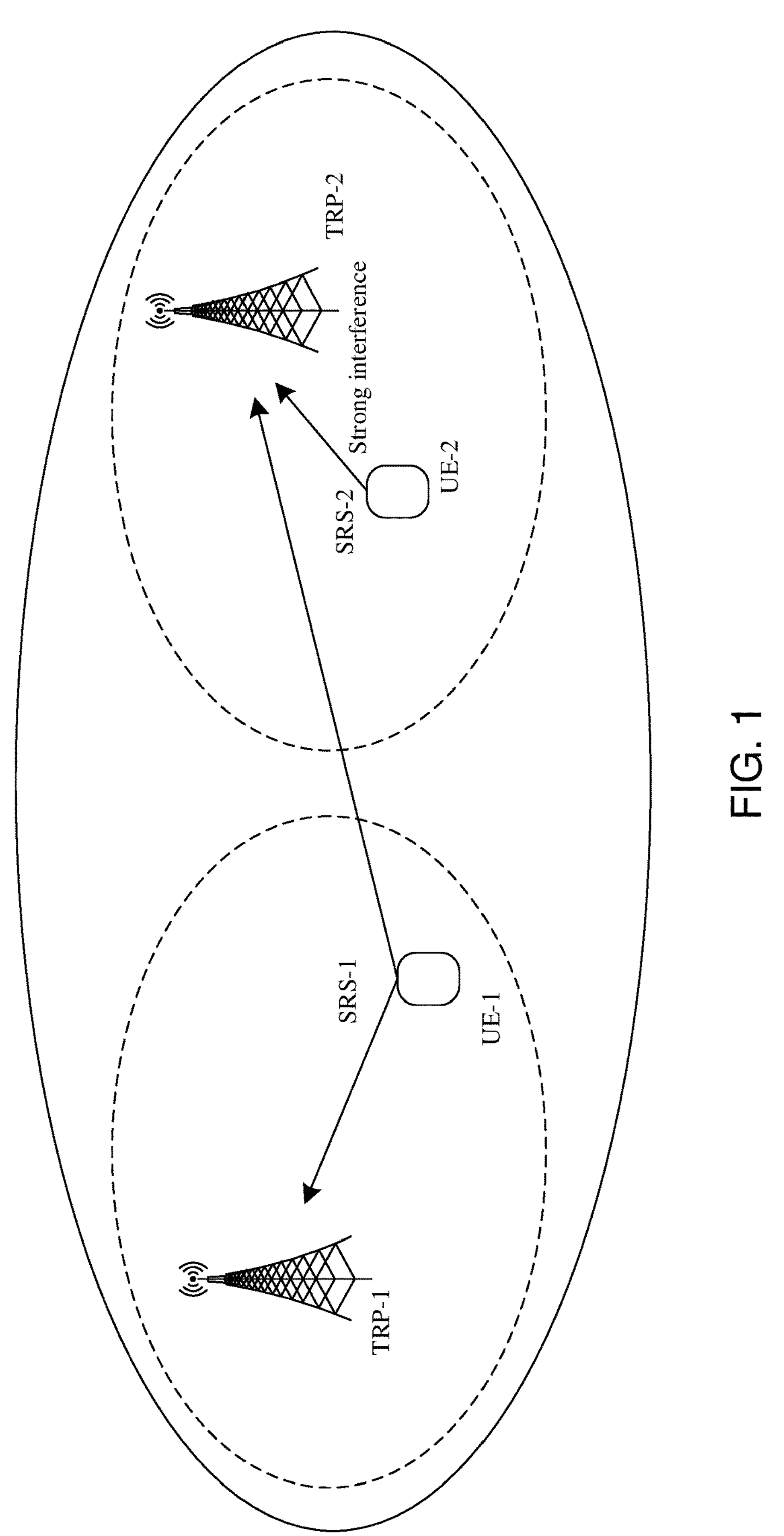
FIG. 1 shows an example scenario of an inter-cell/TRP interference in C-JT/multi-TRP scenarios for SRS.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

In 5G NR, time division duplex (TDD) based network is emerging as a majority design, due to the fact that under the requirement of wide or ultra-wide spectrum, the spectrum pair for frequency division duplex (FDD) based network becomes few. With the help of the channel reciprocity, sounding reference signal (SRS) design is important for wireless channel estimation for both DL and UL transmission. But, quite different from DL RS (e.g., SSB or CSI-RS), the SRS transmission have at least the following two characteristics:

- SRS transmission can be UE-specific (rather than probably cell-specific (e.g., synchronization signal block (SSB) and periodic/semi-persistent channel state information reference signal (CSI-RS))). That means that in an ultra-dense network (UDN) or a coherent joint-transmission (C-JT)/multi-transmission point (TRP) scenario, SRS resource overhead and corresponding capacity becomes a serious challenge.

Transmission power for SRS can be restricted. For instance, there is up to 23 dBm for UL/SRS transmission, but up to 46 dBm for DL. It means that, especially for cell-edge UE, due to non-orthogonal property between SRS sequences from different neighbouring cells, inter-cell/TRP cross-SRS interference becomes non-negligible (especially for C-JT/multi-TRP), and makes serious influence on SRS based channel estimation.

For being suitable for at least UDN and C-JT/multi-TRP scenarios among other possible scenarios or wireless technologies, improvement for the SRS capacity and interference randomization can be considered. To be more specific, the following technical features can be considered in some embodiments.

For SRS capacity, assuming that there is no additional resource consuming and sequence enhancement, enhancement for time and TD-OCC and partial frequency can be considered.

Firstly, UE-level TD-OCC can be used on the repetition symbols in order to maintain the SRS capacity, and in such case, different OCC codes can be configured for different UEs performing repetition.

After that, a higher partial frequency scaling factors (e.g., 6 or 8) for partial frequency hopping scheme can be considered. By using advance channel estimation scheme, e.g., compressed sensing, the gNB still have well re-establish channel response based on the measurement results in the partial frequency.

If there are limited orthogonal resource, the collision or cross-SRS interference for inter-TRP/cell may not be precluded. So, the motivation of interference randomization is to avoid the continuous serious interference for each of measurement occasion, and consequently it can improve the transmission performance of cell-edge or C-JT UE. After that, the randomization for SRS transmission in terms of sequence, frequency and time domains can be considered.

In order to have a good backward compatibility, the dynamic indication/configuration for above capacity and randomization enhancement can be considered. For instance, once the UE is not scheduled for C-JT but only for s-TRP operation, the interference randomization may be unnecessary but also introduce the additional interference for UEs within a same cell. So, the dynamic switching between the mode of interference randomization and legacy mode can be considered.

The interference problem can be even worse in C-JT/multi-TRP scenario, since SRS signals should be received and estimated by multiple TRPs. The distributed TRPs will cause uneven/strong interference of received SRS signals from other UEs (cell-centric) in the coordination cell as shown in FIG. 1. The performance decrease is mainly caused by poor estimation of SRS signal in multi-TRP case. Therefore, SRS enhancement for managing inter-TRP cross-SRS interference targeting TDD CJT via SRS capacity enhancement and/or interference randomization can be considered as described in this patent document.

For instance, some constraints for mitigating update for SRS design may be needed: 1) without consuming additional resources for SRS, 2) reuse existing SRS comb structure, 3) without new SRS root sequences.

An SRS resource is configured by RRC and consists of $$N_{ap}^{SRS} \in \{1, 2, 4\} \text{ antenna ports } \{p_i\}_{i=0}^{N_{ap}^{SRS}-1}, \text{ where } N_{ap}^{SRS}$$

denotes the number of antenna ports $$N_{symb}^{SRS} \in \{1, 2, 4, 8, 12\}$$

That denotes that number of consecutive OFDM symbols $l_0$, the starting position in the time domain given by $$l_0 = N_{symb}^{slot} - 1 - l_{offset}$$

where the offset $l_{offset} \in \{0,1, \ldots, 13\}$ counts symbols backwards from the end of the slot.

$k_0$, the frequency-domain starting position of the sounding reference signal

Then, the SRS sequence for an SRS resource can be generated according to $$r^{(p_i)}(n, l') = r_{u,v}^{(\alpha_i,\delta)}(n)$$

$$0 \le n \le M_{sc,b}^{SRS} - 1$$

$$l' \in \{0, 1, \ldots, N_{symb}^{SRS} - 1\}$$

where $$M_{sc,b}^{SRS}$$

denotes length of the sounding reference signal sequence and sequence is given by $$M_{sc,b}^{SRS} = m_{SRS,b} N_{sc}^{RB} / (K_{TC} P_F),$$

where $m_{SRS,b}$ represents the bandwidth of SRS, $$b = B_{SRS} \text{ where } B_{SRS} \in \{0, 1, 2, 3\}$$

is given by the field b-SRS configured by RRC.

Then, $$r_{u,v}^{(\alpha,\delta)}(n)$$

is a type of sequence (e.g., defined in clause 5.2.2 in TS 38.211 or ZC sequence)

$\delta = \log_2(K_{TC})$ and the transmission comb number $K_{TC} \in \{2,4,8\}$ is contained in the higher-layer parameter transmissionComb.

The cyclic shift $\alpha_i$ for antenna port $p_i$ is given as $$-\alpha_i = 2\pi \frac{n_{SRS}^{cs,i}}{n_{SRS}^{cs,max}}$$

$$n_{SRS}^{cs,i} =$$

-continued $$\begin{cases} \left(n_{SRS}^{cs} + \frac{n_{SRS}^{cs,max}\lfloor(p_i - 1000)/2\rfloor}{N_{ap}^{SRS}/2}\right) \bmod n_{SRS}^{cs,max} & \text{if } N_{ap}^{SRS} = 4 \text{ and } n_{SRS}^{cs,max} = 6 \\ \left(n_{SRS}^{cs} + \frac{n_{SRS}^{cs,max}(p_i - 1000)}{N_{ap}^{SRS}}\right) \bmod n_{SRS}^{cs,max} & \text{otherwise} \end{cases},$$

where $$n_{SRS}^{cs} \in \{0, 1, \ldots, n_{SRS}^{cs,max} - 1\}$$

denotes the value of the corresponding cyclic shift, and then maximum number of cyclic shifts is given by $$n_{SRS}^{cs,max}.$$

The sequence group $$u = \left(f_{gh}\left(n_{s,f}^{\mu}, l'\right) + n_{ID}^{SRS}\right)$$

mod 30 and the sequence number v are also configured by RRC.

$$n_{ID}^{SRS} \text{ and } n_{s,f}^{\mu}$$

denotes the SRS sequence identity and the number of slots in a frame with subcarrier spacing configuration μ.

The quantity $$l' \in \{0, 1, \ldots, N_{symb}^{SRS} - 1\}$$

is the OFDM symbol number within the SRS resource.

if groupOrSequenceHopping equals 'neither', neither group, nor sequence hopping can be used and $$f_{gh}\left(n_{s,f}^{\mu}, l'\right) = 0$$
$$v = 0$$

if groupOrSequenceHopping equals 'groupHopping', group hopping but not sequence hopping can be used and $$f_{gh}\left(n_{s,f}^{\mu}, l'\right) = \left(\sum_{m=0}^{7} c\left(8\left(n_{s,f}^{\mu} N_{symb}^{slot} + l_0 + l'\right) + m\right) \cdot 2^m\right) \bmod 30$$
$$v = 0$$

where c(i) denotes the pseudo-random sequence and can be initialized with $$c_{init} = n_{ID}^{SRS}$$

at the beginning of each radio frame.

if groupOrSequenceHopping equals 'sequenceHopping', sequence hopping but not group hopping can be used and $$f_{gh}\left(n_{s,f}^{\mu}, l'\right) = 0$$
$$v = \begin{cases} c\left(n_{s,f}^{\mu} N_{symb}^{slot} + l_0 + l'\right) & M_{sc,b}^{SRS} \geq 6N_{sc}^{RB} \\ 0 & \text{otherwise} \end{cases}$$

where c(i) denotes the pseudo-random sequence and can be initialized with $$c_{init} = n_{ID}^{SRS}$$

at the beginning of each radio frame.

When SRS is transmitted on a given SRS resource, the sequence $r^{(p_i)}(n,l')$ for each OFDM symbol l' and for each of the antenna ports of the SRS resource can be multiplied with the amplitude scaling factor $\beta_{SRS}$ in order to conform to the transmit power and mapped in sequence starting with $r^{(p_i)}(0,l')$ to resource elements (k,l) in a slot for each of the antenna ports $P_i$ according to $$a_{K_{TC}k'+k_0^{(p_i)},l'+l_0}^{(p_i)} = \begin{cases} \frac{1}{\sqrt{N_{ap}}} \beta_{SRS} r^{(p_i)}(k', l') & k' = 0, 1, \ldots, M_{sc,b}^{SRS} - 1 \quad l' = 0, 1, \ldots, N_{symb}^{SRS} - 1 \\ 0 & \text{otherwise} \end{cases}$$

The frequency-domain starting position $$k_0^{(p_i)}$$

is defined by (Note that SRS for positioning is ignored herein)

$$k_0^{(p_i)} = \bar{k}_0^{(p_i)} + n_{offset}^{FH} + n_{offset}^{RPFS} \text{ where}$$

$$\bar{k}_0^{(p_i)} = n_{shift} N_{sc}^{RB} + k_{TC}^{(p_i)} \bmod K_{TC}$$

$$k_{TC}^{(p_i)} = \begin{cases} (\bar{k}_{TC} + K_{TC}/2) \bmod K_{TC} & \text{if } N_{ap}^{SRS} = 4,\ p_i \in \{1001, 1003\}, \text{ and } n_{SRS}^{cs,max} = 6 \\ (\bar{k}_{TC} + K_{TC}/2) \bmod K_{TC} & \text{if } N_{ap}^{SRS} = 4,\ p_i \in \{1001, 1003\}, \text{ and } n_{SRS}^{cs} \in \left\{n_{SRS}^{cs,max}/2, \ldots, n_{SRS}^{cs,max} - 1\right\} \\ \bar{k}_{TC} & \text{otherwise} \end{cases}$$

-continued $$n_{offset}^{FH} = \sum_{b=0}^{B_{SRS}} K_{TC} M_{sc,b}^{SRS} n_b$$

$$n_{offset}^{RPFS} = N_{sc}^{RB} m_{SRS,B_{SRS}} ((k_F + k_{hop}) \bmod P_F) / P_F$$

and $k_F \in \{0,1, \ldots, P_F-1\}$ is given by the higher-layer parameter StartRBIndex if configured, otherwise $k_F=0$;

$k_{hop}$ is given by Table-1 with $$\bar{k}_{hop} = \left\lfloor \frac{n_{SRS}}{\prod_{b'=b_{hop}}^{B_{SRS}} N_{b'}} \right\rfloor \bmod P_F$$

$$N_{b_{hop}} = 1$$

TABLE 1

The quantity $k_{hop}$ as a function of $\bar{k}_{hop}$.

| | $k_{hop}$ | | |
|---|---|---|---|
| $\bar{k}_{hop}$ | $P_F = 1$ | $P_F = 2$ | $P_F = 4$ |
| 0 | 0 | 0 | 0 |
| 1 | — | 1 | 2 |
| 2 | — | — | 1 |
| 3 | — | — | 3 |

The frequency domain shift value $n_{shift}$ adjusts the SRS allocation with respect to the reference point grid and is contained in the higher-layer parameter freqDomainShift. The transmission comb offset $\bar{k}_{TC} \in \{0,1, \ldots, K_{TC}-1\}$ is contained in a higher-layer parameter and $n_b$ is a frequency position index.

Frequency hopping of the sounding reference signal is configured by the parameter $b_{hop} \in \{0,1,2,3\}$, given by the field b-hop contained in the higher-layer parameter freqHopping if configured, otherwise $b_{hop}=0$.

If $b_{hop} \geq B_{SRS}$, frequency hopping is disabled and the frequency position index $n_b$ remains constant (unless re-configured) and is defined by $$n_b = \lfloor 4 n_{RRC} / m_{SRS,b} \rfloor \bmod N_b$$

for all $$N_{symb}^{SRS}$$

OFDM symbols of the SRS resource. The quantity $n_{RRC}$ is given by the higher-layer parameter freqDomainPosition.

If $b_{hop} < B_{SRS}$, frequency hopping is enabled and the frequency position indices $n_b$ are defined by $$n_b = \begin{cases} \lfloor 4 n_{RRC} / m_{SRS,b} \rfloor \bmod N_b & b \leq b_{hop} \\ (F_b(n_{SRS}) + \lfloor 4 n_{RRC} / m_{SRS,b} \rfloor) \bmod N_b & \text{otherwise} \end{cases}$$

where $N_b$ is given by Table 6.4.1.4.3-1, $$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

and where $N_{b_{hop}}=1$ regardless of the value of $N_b$. The quantity $n_{SRS}$ counts the number of SRS transmissions, e.g., SRS counter.

For the case of an SRS resource configured as aperiodic by the higher-layer parameter resourceType, it is given by $n_{SRS}=\lfloor l'/R \rfloor$ within the slot in which the $$N_{symb}^{SRS}$$

symbol SRS resource is transmitted. The quantity $$R \leq N_{symb}^{SRS}$$

is the repetition factor given by the field repetitionFactor if configured, otherwise $$R = N_{symb}^{SRS}.$$

For the case of an SRS resource configured as periodic or semi-persistent by the higher-layer parameter resourceType, the SRS counter is given by $$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor$$

for slots that satisfy $$\left(N_{slot}^{frame,\mu} n_f + n_{s,f}^{\mu} - T_{offset}\right) \bmod T_{SRS} = 0,$$

where $T_{SRS}$ and $T_{offset}$ denotes periodicity in slots and slot offset, respectively. The SRS counter may include an index value that is associated with each of SRS transmission occasion.

II. Example Technical Solutions

In this patent document, the term "beam state" can be equivalent to quasi-co-location (QCL) state, transmission configuration indicator (TCI) state, spatial relation (also known as spatial relation information), reference signal (RS), spatial filter or pre-coding. Furthermore, in this patent document, "beam state" can also be known as "beam". For example, The term "Tx beam" can be equivalent to QCL state, TCI state, spatial relation state, DL reference signal, UL reference signal, Tx spatial filter or Tx precoding;

The term "Rx beam" can be equivalent to QCL state, TCI state, spatial relation state, spatial filter, Rx spatial filter or Rx precoding;

The term "beam ID" can be equivalent to QCL state index, TCI state index, spatial relation state index, reference signal index, spatial filter index or precoding index.

Specifically, the spatial filter can be either UE-side or gNB-side one, and the spatial filter can also be known as spatial-domain filter.

In this patent document, "spatial relation information" is comprised of one or more reference RSs, which is used to represent the same or quasi-co "spatial relation" between targeted "RS or channel" and the one or more reference RSs.

In this patent document, "spatial relation" means the beam, spatial parameter, or spatial domain filter.

In this patent document, "QCL state" is comprised of one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] Spatial parameter (which can also be known as spatial Rx parameter). In this patent document, "TCI state" is equivalent to "QCL state". In this patent document, there are the following definitions for 'QCL-TypeA', 'QCL-TypeB', 'QCL-TypeC', and 'QCL-TypeD'.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

In this patent document, a RS may comprise channel state information reference signal (CSI-RS), synchronization signal block (SSB) (which can also be known as SS/PBCH), demodulation reference signal (DMRS), sounding reference signal (SRS), and/or physical random access channel (PRACH). Furthermore, the RS can at least comprise DL reference signal and UL reference signalling.

In some embodiments, a DL RS at least comprises CSI-RS, SSB, DMRS (e.g., DL DMRS);

In some embodiments, a UL RS at least comprises SRS, DMRS (e.g., UL DMRS), and PRACH.

In this patent document, "UL signal" can be PUCCH, PUSCH, or SRS.

In this patent document, "DL signal" can be PDCCH, PDSCH, or CSI-RS.

In this patent document, "time unit" can be sub-symbol, symbol, slot, subframe, frame, or transmission occasion. In this patent document, a SRS related time unit can include a SRS counter that indicates an index associated with a transmission of the SRS, a number of slots, a symbol index of a symbol associated with the SRS, or a number of symbols associated with the SRS. In this patent document, 'SRS counter' can be equivalent to the number of SRS transmissions.

In this patent document, 'PDCCH' is equivalent to 'DCI'. In this patent document, 'orthogonal cover code (OCC) function' is equivalent to one or more vector(s)/matrix(es) comprising OCC.

In this patent document, power control parameter comprises at least one of pathloss RS, open-loop parameter, and closed loop index. In this patent document, 'UL power control parameter' is equivalent to 'power control parameter'.

In this patent document, 'closed loop index' is equivalent to 'power control adjustment state'.

In this patent document, 'open-loop parameter' comprises at least one of a target power, e.g., P0, and a factor, e.g., alpha.

II.(a) Embodiment #1: General Description for SRS Capacity Improvement and Interference Randomization For SRS transmission framework, a comprehensive/packet approach for capacity improvement and interference randomization is proposed for accommodating high-capacity and low-interference requirement for UDN and C-JT/multi-TRP. To be more specific, the following aspects can be considered:

For improving SRS capacity, no additional resource and sequence consuming may be assumed, and then based on that, the mechanisms of TD-OCC and partial frequency hopping can be identified.

Then, in order to mitigate cross-SRS interference for inter/intra-TRP/cell, interference randomization with some additional hopping schemes (e.g., both sequence and group hopping, each of which has different initialization values) and further flexible hopping schemes (e.g., in terms of frequency and sequence) as a function of time-domain parameter are proposed.

Finally, for having a good backward compatibility, the dynamic switching/activation between different mode (e.g., dynamic switching between interference randomization mode and legacy mode by a DCI command) are considered.

According to SRS configuration parameter(s) (as further explained below), a UE may generate SRS sequence, and the UE determines a content (e.g., coefficient) of the resource element(s) (e.g., physical resources in the frequency and time domain) according to the SRS sequence. After that, the corresponding SRS (or a symbol corresponding to a part of the SRS sequence) is transmitted by the UE. In some embodiments, the content of the resource element may include a phase and/or amplitude. In some embodiments, a symbol may be referred to as a variable and may include coefficient(s).

For TD-OCC, the content of the resource element(s) is further determined according to an OCC function (e.g., the $w_t(l' \bmod O_{TD\text{-}OCC})$ function described in this patent document in at least Embodiment #2). Each element of the OCC function can be determined according to time-domain index and/or frequency-domain index of the resource elements.

Furthermore, the OCC function can be represent by $w_t(l)$ and a set of values for the OCC function can be indicated by a OCC parameter Furthermore, the OCC parameter can be RRC configured (e.g., in SRS resource or in SRS resource set), MAC-CE activated or associated with beam state.

For instance, when the first type of OCC parameter is enabled (e.g., OCC parameter =1 in Table 2 below), $w_t(l=0)=+1$, and $w_t(l=1)=+1$; otherwise (e.g., when the second type of OCC parameter is enabled (e.g., OCC parameter=2 in Table 2 below)), $w_t(l=0)=+1$, and $w_t(l=1)=-1$ Some more details can be found in Embodiment #2.

For partial frequency hopping, additional partial frequency scaling factor can be introduced (e.g., PF=6, 8 or more) and can be configured.

Furthermore, there are more than one pattern for frequency hopping under a given PF scaling factor.

Furthermore, the step for frequency hopping can be 1 or PF/2, in order to avoid cross-SRS interference and measure the whole bandwidth quickly. In an example implementation where a frequency hopping pattern within each of a plurality of subbands (e.g., frequency offset) is [0, 4, 1, 5, 2, 6, 3, 7] (the values within the square brackets indicate sub-subband position within each of the plurality of subbands), if the step for frequency hopping is 1, then the UE transmits the SRS sequence on sub-subband 0 in each of the plurality of subbands, then sub-subband 4 in each of the plurality of subbands, and so on until sub-subband 7 in each of the plurality of subbands. In another example implementation where a frequency hopping is [0, 4, 1, 5, 2, 6, 3, 7], if the step for frequency hopping is PF/2, then the UE transmits the SRS sequence on sub-subband 0 in each of the plurality of subbands, then sub-subband 2 in each of the plurality of subbands so that the UE skips four sub-subbands. In some embodiments, the steps for frequency hopping is configurable and can be indicated by a base station to the UE. In some embodiments, the term "sub-subband" may be referred to a group of frequency resources within a subband.

Furthermore, for PF=8, the first pattern for frequency hopping (e.g., frequency offset) is [0, 4, 1, 5, 2, 6, 3, 7]; the second pattern is [0, 1, 2, 3, 4, 5, 6, 7]; third pattern for frequency hopping is [0, 2, 4, 6, 1, 3, 5, 7], where the values within the square brackets indicate the sub-subband position within each of the plurality of subbands.

Furthermore, for PF=4, the first, second, third patterns for frequency hopping (e.g., frequency offset) are [0, 2, 1, 3], [0, 1, 3, 2], or [0, 1, 2, 3], respectively, where the values within the square brackets indicate the sub-subband position within each of the plurality of subbands.

Some more details can be found in Embodiment #3.

For SRS interference randomization, the following two aspects are considered:

Firstly, the mode that indicates both sequence and group hopping can be configured by RRC Then, the initialization value (C_init) for SRS sequence generation (e.g., for either or both sequence and group hopping) can be determined according to SRS related time unit (e.g., SRS counter (n_SRS) or symbol index within a OFDM where the content associated with the SRS sequence is transmitted) (e.g., being updated as a function of the SRS related time unit);

For instance, there are two initialization values, and for odd and even time units (e.g., symbol index within an OFDM or after first OFDM symbol of SRS resource in a slot), the different.

After that, the frequency location of the subband or the sub-subband for transmission of the symbol associated with the SRS sequence (involving hopping pattern, partial frequency hopping pattern, comb offset) can be determined according to SRS related time unit (e.g., n_SRS or symbol index within a OFDM) (e.g., being updated as a function of the SRS related time unit);

Some more details can be found in Embodiment #4.

In order to accommodate the case with both enhanced and legacy UE, the dynamic switching between different modes for capacity enhancement and interference randomization and dynamic update for some SRS related parameter or SRS configuration parameter(s) (e.g., hopping pattern, comb offset, and time-unit offset for SRS) are considered.

The at least one of following SRS configuration parameter(s) can be indicated to the UE dynamically by DCI or MAC-CE command, or can be associated with beam state or time domain resource assignment (TDRA field).

Mode for OCC that indicates a type of time domain OCC that is enabled (e.g., turning on TD-OCC-2 or TD-OCC-4)

OCC parameter (e.g., 0 . . . 3 for TD-OCC-4)

PF-hopping scaling factor

PF-hopping mapping, or an offset for PF hopping mapping

Initialization value (e.g., $C_{init}$), or an offset for initialization value

Furthermore, the initialization value comprises at least one of initialization value for sequence group, and initialization value for sequence number Furthermore, the offset for initialization value comprises at least one of an offset for initialization value for sequence group, and an offset for initialization value for sequence number.

Frequency-domain position of the SRS sequence

Frequency hopping parameter (e.g., CSRS, $B_{SRS}$, $b_{hop}$)

SRS sequence identify (e.g., $$n_{ID}^{SRS})$$

(also known as SRS sequence identifier), or an offset for SRS sequence identify

Cyclic shift

Comb offset

For instance, the mode for TD-OCC can be enabled or disabled by DCI or MAC-CE command.

When the beam state is applied, the corresponding parameter associated with the beam state can be determined accordingly.

For instance, when the beam state is applied X time units after the ACK corresponding to the DCI, the corresponding parameters associated with the beam state (regardless of turning on or off) should be applied simultaneously.

Furthermore, when the more than one beam state is indicated, the respective parameters corresponding to each beam state (e.g., TD-OCC, partial frequency hopping or interference randomization) is applied by default.

For instance, for C-JT, in order to enable transmission for more than one TRP, the more than one beam state should be indicated accordingly. In such case, the interference randomization mode, e.g., the initialization value (C_init) for SRS sequence generation can be determined according to SRS related time unit (e.g., both n_SRS and symbol index within an OFDM).

Figure 2:
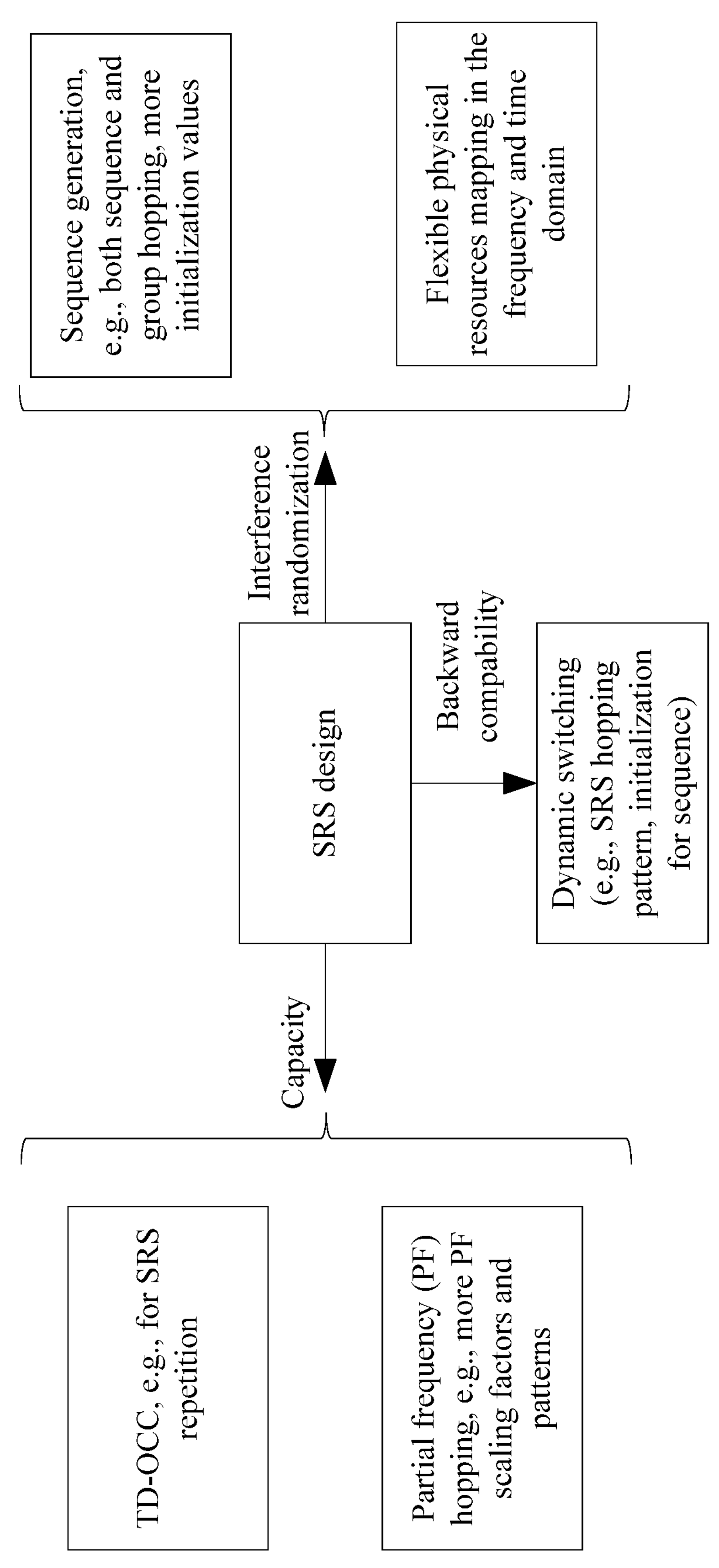
FIG. 2 shows an example framework for capacity improvement and interference randomization for SRS transmission.

For sake of presentation, a diagram for the framework for capacity improvement and interference randomization for SRS transmission can be found in FIG. 2. It should be noticed that, dynamic switching may also be useful for avoiding strong cross-SRS interference (as one type of SRS interference randomization) though being based on gNB scheduling.

II.(b). Embodiment #2: TD-OCC for SRS Capacity Improvement

Generally speaking, the UE for C-JT/mTRP may be cell-edge UE with high probability (in such case, the respective SINR/RSRP corresponding to each TRP may be similar). So, in order to guarantee UL channel estimation based on SRS, SRS repetition may be enabled but as a cost, the SRS capacity may be reduced. Then, UE-level TD-OCC can be used on the repetition symbols in order to maintain the SRS capacity.

That is, different OCC codes can be configured for different UEs performing repetition.

Then for a K-symbol repetition, K UEs can be multiplexed in these symbols by using length-K OCC, which achieves same capacity as not using repetition.

Therefore, if repetition is to be increased, TD-OCC (e.g., OCC-2 and OCC-4; Ns=4, R=2) can be used for compensating the negative impact on SRS capacity.

For TD-OCC, the content of the symbol of resource element(s) is further determined according to an OCC function, each element of which is determined according to time-domain index and/or frequency-domain index.

Furthermore, the OCC parameter corresponding to OCC function (e.g., TD-OCC=2, TD-OCC=4) can be configured by RRC.

Furthermore, the OCC parameter can be configured by a parameter combination comprising both OCC parameter and Repetition factor, e.g., R=1, 2, 4.

Furthermore, the OCC parameter can be associated with Repetition factor, e.g., R=1, 2, 4.

Furthermore, once OCC function is enabled, the OCC parameter can be determined according to repetition factor.

Furthermore, the single OCC function applies to all RE(s) with the same frequency location and within the repetition pair (corresponding to R).

Furthermore, the OCC function can be determined according to a group index.

Furthermore, the group index comprises RE index, RB index or index of group of RE(s) or RB(s)

Due to phase noise, the TD-OCC may only apply to FR-1 (e.g., sub-6 GHz)

Furthermore, in such case, the spatial relation are precluded being applicable, or QCL-TypeD is precluded being applicable. For example, the spatial relation or QCL-TypeD cannot be configured in some embodiments.

Furthermore, if Repetition factor R is not configured, it imply that R is equal to number of OFDM symbol of SRS (e.g., $$N_{symb}^{SRS}),$$

and the OCC function is disable.

Furthermore, if Repetition factor R is not configured, it imply that R is equal to number of OFDM symbol of SRS, and the OCC function is enabled, and the OCC parameter is determined according to number of OFDM symbol of SRS (e.g., $$N_{symb}^{SRS}).$$

Regarding UL power control for TD-OCC, the following aspects are considered:

Furthermore, the Tx power or UL power control parameter for SRS within a repetition or OCC is kept unchanged, or the UL Tx power for SRS is determined per repetition or OCC.

For instance, the update of closed loop for SRS occurs at the beginning of the first transmitted SRS repetition in the SRS resource Furthermore, the transmission occasion for SRS is determined according to a repetition or a OCC For instance, the transmission occasion for SRS is a nominal repetition.

If the TD-OCC mode is enabled, the sequence $r^{(P_i)}(n, l')$ for each OFDM symbol l' and for each of the antenna ports of the SRS resource can be multiplied with the amplitude scaling factor $\beta_{SRS}$ in order to conform to the transmit power and mapped in sequence starting with $r^{(p_i)}(0,l')$ to resource elements (k,l) in a slot for each of the antenna ports $p_i$ according to $$a^{(p_i)}_{K_{TC}k'+k_0^{(p_i)},l'+l_0} = \begin{cases} \frac{1}{\sqrt{N_{ap}}}\beta_{SRS}r^{(p_i)}(k',l')w_t(l' \bmod O_{TD-OCC}) & k'=0,1,\ldots,M_{sc,b}^{SRS}-1 \quad l'=0,1,\ldots,N_{symb}^{SRS}-1 \\ 0 & \text{otherwise} \end{cases}$$

where $O_{TD\text{-}OCC}$ denotes the mode of OCC parameter (e.g., TD-OCC-2 or TD-OCC-4) or the $O_{TD\text{-}OCC}$ denotes the mode that indicates a type of TD-OCC that is enabled. For instance, the value of $w_t(x)$ is given in Table 2, if TD-OCC-4 is enabled.

TABLE 2

Parameter for OCC if TD-OCC-4 is enabled ($O_{TD\text{-}OCC} = 4$).

| OCC | $w_t(x)$ | | | |
|---|---|---|---|---|
| parameter | x = 0 | x = 1 | x = 2 | x = 3 |
| 0 | +1 | +1 | +1 | +1 |
| 1 | +1 | −1 | +1 | +1 |
| 2 | +1 | +1 | −1 | −1 |
| 3 | +1 | −1 | −1 | +1 |

For backward compatibility,

The legacy UE can NOT be enabled by TD-OCC mode, and so by default, the OCC vector is [+1, +1] (for TD-OCC-2) or [+1, +1, +1, +1] (for TD-OCC-4).

Figure 3:
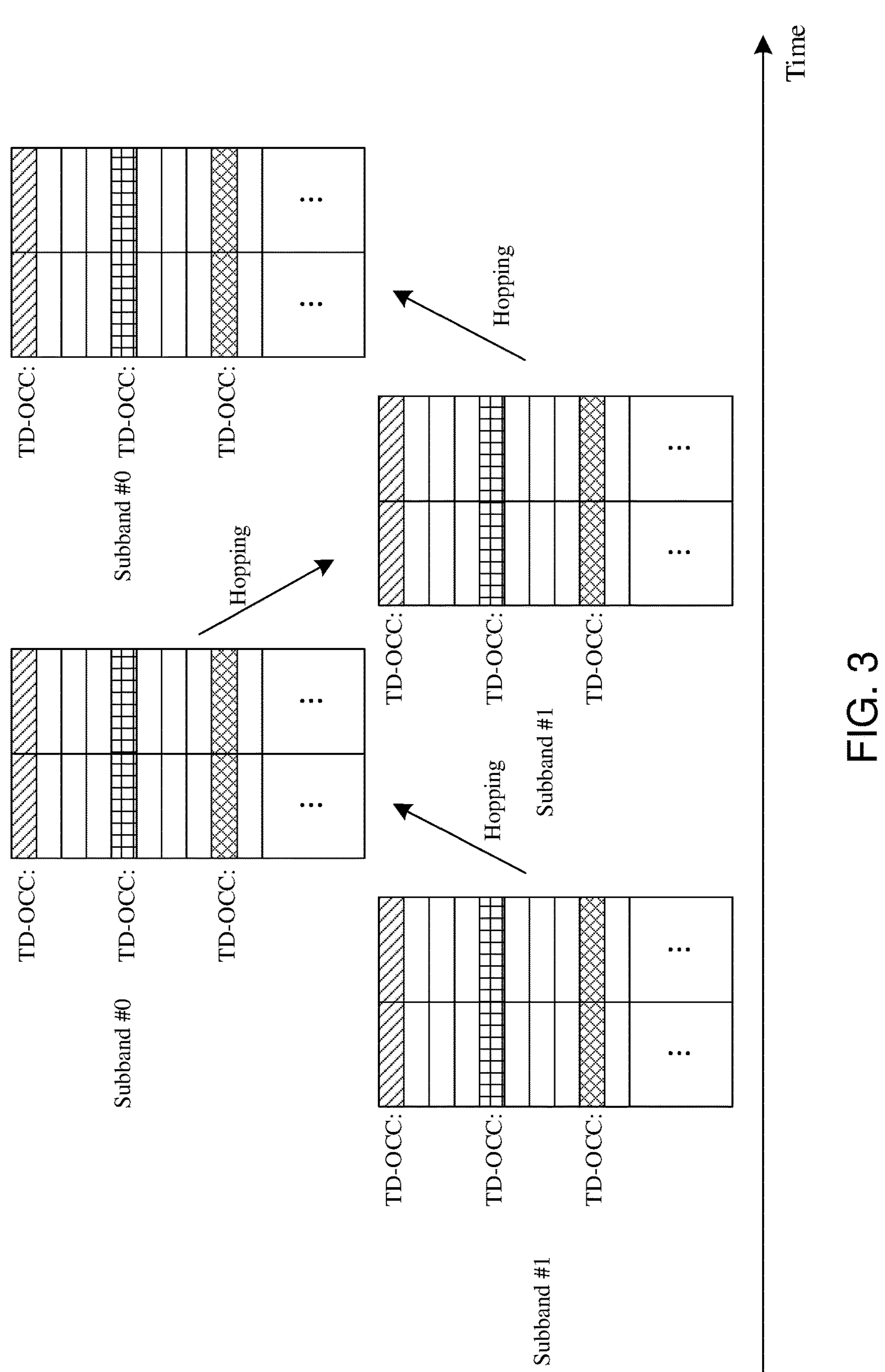
FIG. 3 shows an example TD-OCC for SRS capacity improvement

Then, the new UE should be indicated for the OCC vector [+1, −1] (for TD-OCC-2), or [+1, +1, −1, −1]/[+1, −1, −1, +1] (for TD-OCC-4);

For instance, one example for TD-OCC-2 with frequency hopping can be found in FIG. 3. In such case, Comb-4 and Repetition factor is 2.

II.(c). Embodiment #3: Partial Frequency Hopping for SRS Capacity Improvement By using advance channel estimation scheme, e.g., compressed sensing, the gNB still have well re-establish channel response based on the measurement results in the partial frequency. For SRS capacity improvement, additional partial frequency scaling factor comprising PF=6, 8 or more (besides for PF=2 or 4), can be configured for partial frequency hopping.

Furthermore, there are more than one pattern for partial frequency hopping under a given PF scaling factor.

Furthermore, for PF=8, the first pattern for frequency hopping is [0, 4, 2, 6, 1, 5, 3, 7]; the second pattern is [0, 1, 2, 3, 4, 5, 6, 7]; third pattern for frequency hopping is [0, 2, 4, 6, 1, 3, 5, 7]

Furthermore, for PF=4, the first, second, third patterns for frequency hopping are [0, 2, 1, 3], [0, 1, 3, 2], or [0, 1, 2, 3], respectively;

Then, for enabling interference randomization, the pattern for partial frequency hopping, e.g., mapping between $k_{hop}$ and $\bar{k}_{hop}$, can be determined according to the number of SRS transmission (e.g., $n_{SRS}$) or OFDM symbol number within the SRS resource (e.g., l') can be considered.

For instance, frequency domain offset for partial frequency hopping is $$n_{offset}^{RPFS} = N_{sc}^{RB} m_{SRS,B_{SRS}} ((k_F + k_{hop}) \bmod P_F) / P_F$$

$k_F \in \{0,1, \ldots, P_F-1\}$ is given by the higher-layer parameter StartRBIndex if configured, otherwise $k_F=0$;

$k_{hop}$ is given by Table-3 with $$\bar{k}_{hop} = \left\lfloor \frac{n_{SRS}}{\prod_{b'=b_{hop}}^{B_{SRS}} N_{b'}} \right\rfloor$$

mod $P_F$ and $N_{b_{hop}}=1$.

Pattern index $$Z = \left\lfloor \frac{n_{SRS}}{P_F \prod_{b'=b_{hop}}^{B_{SRS}} N_{b'}} \right\rfloor + \text{offset},$$

where offset $\in$ {0,1} denotes an offset for PF-hopping mapping and can be configured by RRC.

TABLE 3

The quantity $k_{hop}$ as a function of $\bar{k}_{hop}$, e.g., PF hopping mapping

| | $k_{hop}$ | | | | | |
|---|---|---|---|---|---|---|
| | | | $P_F = 4$ | | $P_F = 8$ | |
| $\bar{k}_{hop}$ | $P_F$ = 1 | $P_F$ = 2 | Z is even | Z is odd | Z is even | Z is odd |
| 0 | 0 | 0 | 0 | 0 | 0 | 0 |
| 1 | — | 1 | 2 | 1 | 4 | 2 |
| 2 | — | — | 1 | 3 | 2 | 6 |
| 3 | — | — | 3 | 2 | 6 | 4 |
| 4 | — | — | — | — | 1 | 7 |
| 5 | — | — | — | — | 5 | 3 |
| 6 | — | — | — | — | 3 | 5 |
| 7 | — | — | — | — | 7 | 1 |

Figure 4:
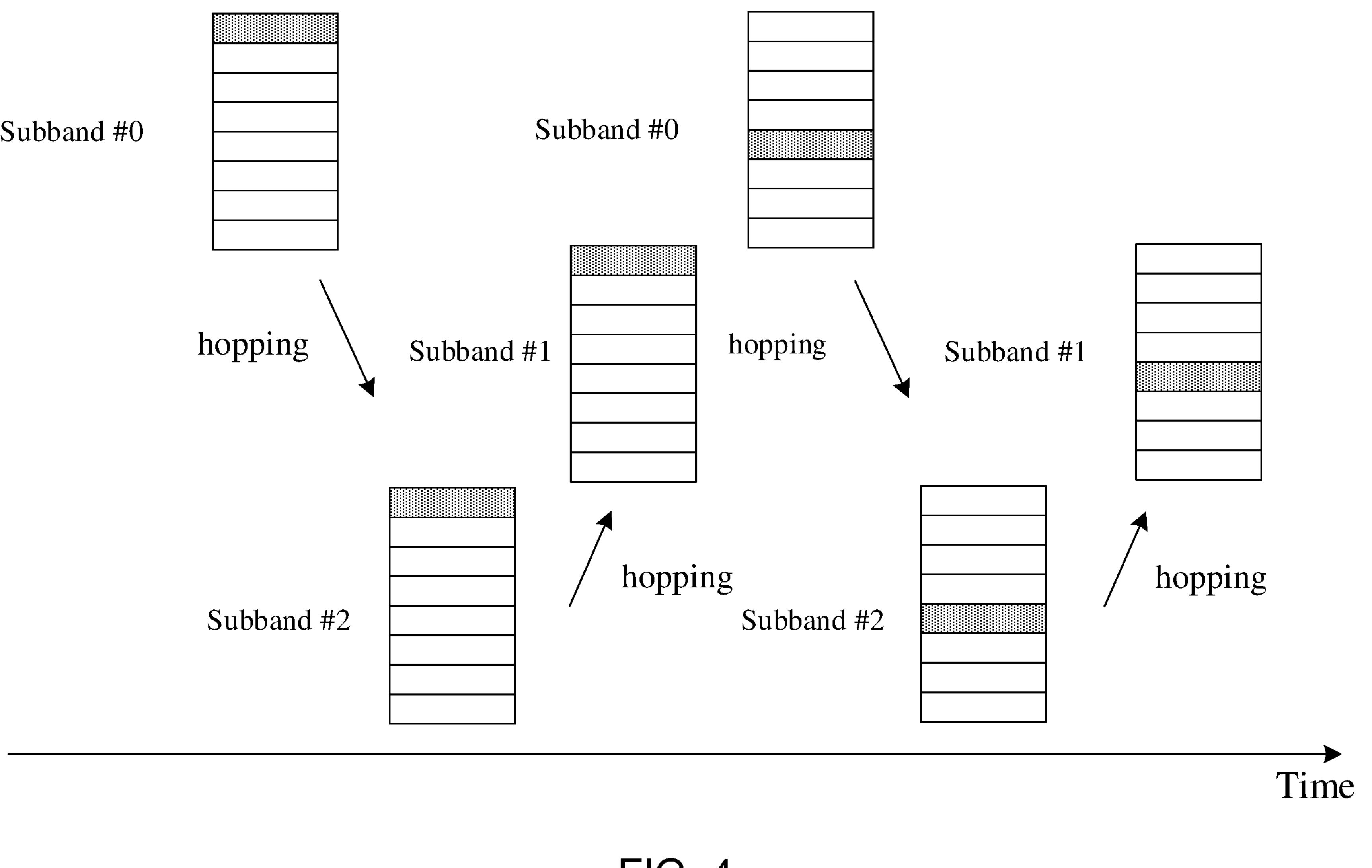
FIG. 4 shows an example partial frequency hopping with PF scaling factor=8

For instance, one example for partial frequency hopping with PF=8 can be found in FIG. 4. In such case, Repetition factor is 1. For example, as shown in the example in FIG. 4, there are three subbands #0, #1, and #2. For each of the three subbands #0, #1, and #2, the UE transmits on sub-subband 0, then on sub-subband 4, and so on using the pattern for PF=8 and Z is even from Table 3.

II.(d). Embodiment #4: SRS Interference Randomization

As discussed before, the interference problem is even worse in C-JT/multi-TRP scenario, since SRS signals should be received and estimated by multiple TRPs, and consequently the neighboring TRPs will cause uneven/strong interference of received SRS signals from other UEs (cell-centric) in the coordination cell. Then, in order to mitigate cross-SRS interference for inter/intra-TRP/cell, interference randomization with some additional hopping schemes (e.g., both sequence and group hopping, each of which has different initialization values) and further flexible hopping schemes (e.g., in terms of frequency and sequence domains) as a function of time-domain parameter are proposed.

For SRS sequence generation, the following for interference randomization is considered.

Furthermore, the mode of both sequence and group hopping can be configured by RRC.

For instance, UE should determine a sequence group $$(\text{e.g., } u = (f_{gh}(n_{s,f}^{\mu}, l') + n_{ID}^{SRS}) \bmod 30)$$

and a sequence number v, as parameters for SRS sequence determination.

Then, for both sequence and group hopping, both sequence group and sequence number $$f_{gh}(n_{s,f}^{\mu}, l') = \left(\sum_{m=0}^{7} c\left(8\left(n_{s,f}^{\mu} N_{symb}^{slot} + l_0 + l'\right) + m\right) \cdot 2^m\right) \bmod 30$$

$$v = \begin{cases} c\left(n_{s,f}^{\mu} N_{symb}^{slot} + l_0 + l'\right) & M_{sc,b}^{SRS} \geq 6N_{sc}^{RB} \\ 0 & \text{otherwise} \end{cases}$$

Furthermore, the initialization value for sequence group and sequence number can be configured separately.

Furthermore, the offset for initialization value for sequence group or sequence number can be configured.

Furthermore, the initialization value (C_init) for SRS sequence generation (e.g., for either or both sequence and group hopping) can be determined according to SRS related time unit (e.g., number of SRS transmission (e.g., $n_{SRS}$), number of slots (e.g., $$n_{s,f}^{\mu})$$

, starting position (e.g., $l_0$), or OFDM symbol number within the SRS resource (e.g., 1 '));

For instance, there are two initialization values, and for odd and even time units (e.g., symbol index within an OFDM or after first OFDM symbol of SRS resource in a slot), the respective initialization values can be used.

For instance, the initialization value (C_init) for SRS sequence generation is determined:

$$c_{init}^{odd} = n_{ID}^{SRS},\ c_{init}^{odd} = n_{ID}^{SRS} + 0,$$

then for group hopping, we have the following:

$$f_{gh}(n_{s,f}^{\mu}, l') = \begin{cases} \left(\sum_{m=0}^{7} c^{even}\left(8\left(n_{s,f}^{\mu} N_{symb}^{slot} + l_0 + l'\right) + m\right) \cdot 2^m\right) \bmod 30 \text{ if } l_0 + l' \text{ is even} \\ \left(\sum_{m=0}^{7} c^{odd}\left(8\left(n_{s,f}^{\mu} N_{symb}^{slot} + l_0 + l'\right) + m\right) \cdot 2^m\right) \bmod 30 \text{ if } l_0 + l' \text{ is odd} \end{cases}$$

$$v = 0$$

where $c^{even}$ and $c^{odd}$ are separately determined according to the initialization value of:

$$c_{init}^{even} \text{ and } c_{init}^{odd}$$

Furthermore, either or both of a sequence group and a sequence number can be determined according to a scaling factor R (e.g., one or more values from {1, 3, 7, 11, 13, 17}) or an offset.

For instance, for group hopping, we have $$f_{gh}(n_{s,f}^{\mu}, l') = \left(\sum_{m=0}^{7} c\left(8\left(R \times n_{s,f}^{\mu} N_{symb}^{slot} + l_0 + l'\right) + m\right) \cdot 2^m\right) \bmod 30$$

$$v = 0$$

which means that for different slot, different scaling factor can be used to change the sequence group dynamically.

For instance, for group hopping, we have $$f_{gh}(n_{s,f}^{\mu}, l') = \begin{cases} \left(\sum_{m=0}^{7} c\left(8\left(R \times n_{s,f}^{\mu} N_{symb}^{slot} + l_0 + l'\right) + m\right) \cdot 2^m\right) \bmod 30 \text{ if } n_{s,f}^{\mu} \text{ is even} \\ \left(\sum_{m=0}^{7} c\left(8\left(R \times n_{s,f}^{\mu} N_{symb}^{slot} + l_0 + l' + offset\right) + m\right) \cdot 2^m\right) \bmod 30 \text{ if } n_{s,f}^{\mu} \text{ is odd} \end{cases}$$

$$v = 0$$

where offset is preconfigured or predefined (e.g., offset=1).

Furthermore, in order to save UE implementation complexity, the above introduced parameter should be the same in a BWP or in a CC. Specifically we have the following rule:

Furthermore, the scaling factor R or offset for SRS sequence group and/or sequence number determination are configured per BWP or per SRS resource set or resource, or is determined according to beam state, PCI or resource group ID (e.g., CORESETPoolID).

For instance, for mDCI-mTRP, the offset of initialization value is determined according to CORESETPoolID, which means that, if the CORESETPoolID is not configured or configured with the value of 0, the offset is zero or ignore; if the CORESETPoolID is configured with the value of 1, the offset is 1.

Furthermore, for SRS resource(s) in a CC, a BWP or a SRS resource set, the scaling factor(s) or offset(s) for SRS sequence group and/or sequence number determination should be the same.

Furthermore, the scaling factor R or offset for SRS sequence group and/or sequence number determination are configured per BWP or per SRS resource set or resource, or is determined according to beam state, PCI or resource group ID (e.g., CORESETPoolID).

For instance, for mDCI-mTRP, the scaling factor R of SRS sequence group determination is determined according to CORESETPoolID, which means that, if the CORESETPoolID is not configured or configured with the value of 0, the offset is 1; if if the CORESETPoolID is configured with the value of 1, the offset is 3.

Furthermore, for SRS resource(s) in a CC, a BWP or a SRS resource set, the value or the offset for sequence initialization should be the same.

Furthermore, for SRS for codebook, noncodebook, beam management and antenna switching, the maximum number of SRS_ID can be configured more than 1023. For instance, the range of SRS_ID in such case can be extended to {0, 1, . . . , 65535}.

For determining SRS physical resources in the frequency and time domain, we have the following for interference randomization. Generally speaking, the frequency location (involving hopping pattern, partial frequency hopping pattern, comb offset) is determined according to SRS related time unit.

Furthermore, at least one of following parameter is determined according to SRS related time unit (e.g., number of SRS transmission (e.g., $n_{SRS}$), number of slots (e.g., $$n_{s,f}^{\mu}),$$

starting position (e.g., $l_0$), or OFDM symbol number within the SRS resource (e.g., l')) (e.g., being updated as a function of the SRS related time unit);

Mode for OCC (e.g., turning on TD-OCC-2 or TD-OCC-4)

OCC parameter (e.g., 0 . . . 3 for TD-OCC-4)

PF-hopping scaling factor

PF-hopping mapping, or an offset for PF hopping mapping

Initialization value (e.g., Cinit), or an offset for initialization value

Furthermore, the initialization value comprises at least one of initialization value for sequence group, and initialization value for sequence number Furthermore, the offset for initialization value comprises at least one of an offset for initialization value for sequence group, and an offset for initialization value for sequence number.

Frequency-domain position (e.g., nRRC)

Frequency hopping parameter (e.g., CSRS, $B_{SRS}$, $b_{hop}$)

SRS sequence identify (e.g., $$n_{ID}^{SRS}),$$

or an offset for SRS sequence identify

Cyclic shift

Comb offset

For instance, the UE can be configure more than one values of frequency-domain position, and which one of the more than one values of frequency-domain position is used is determined according to $$\left\lfloor \frac{n_{SRS}}{\prod_{b'=b_{hop}}^{B_{SRS}} N_{b'}} \right\rfloor.$$

That means that frequency-domain position can be hopped per frequency hopping period For instance, if $$\left\lfloor \frac{n_{SRS}}{\prod_{b'=b_{hop}}^{B_{SRS}} N_{b'}} \right\rfloor$$

is even, the first value is used; otherwise (e.g., if $$\left\lfloor \frac{n_{SRS}}{\prod_{b'=b_{hop}}^{B_{SRS}} N_{b'}} \right\rfloor$$

is odd), the second value is used.

Figure 5:
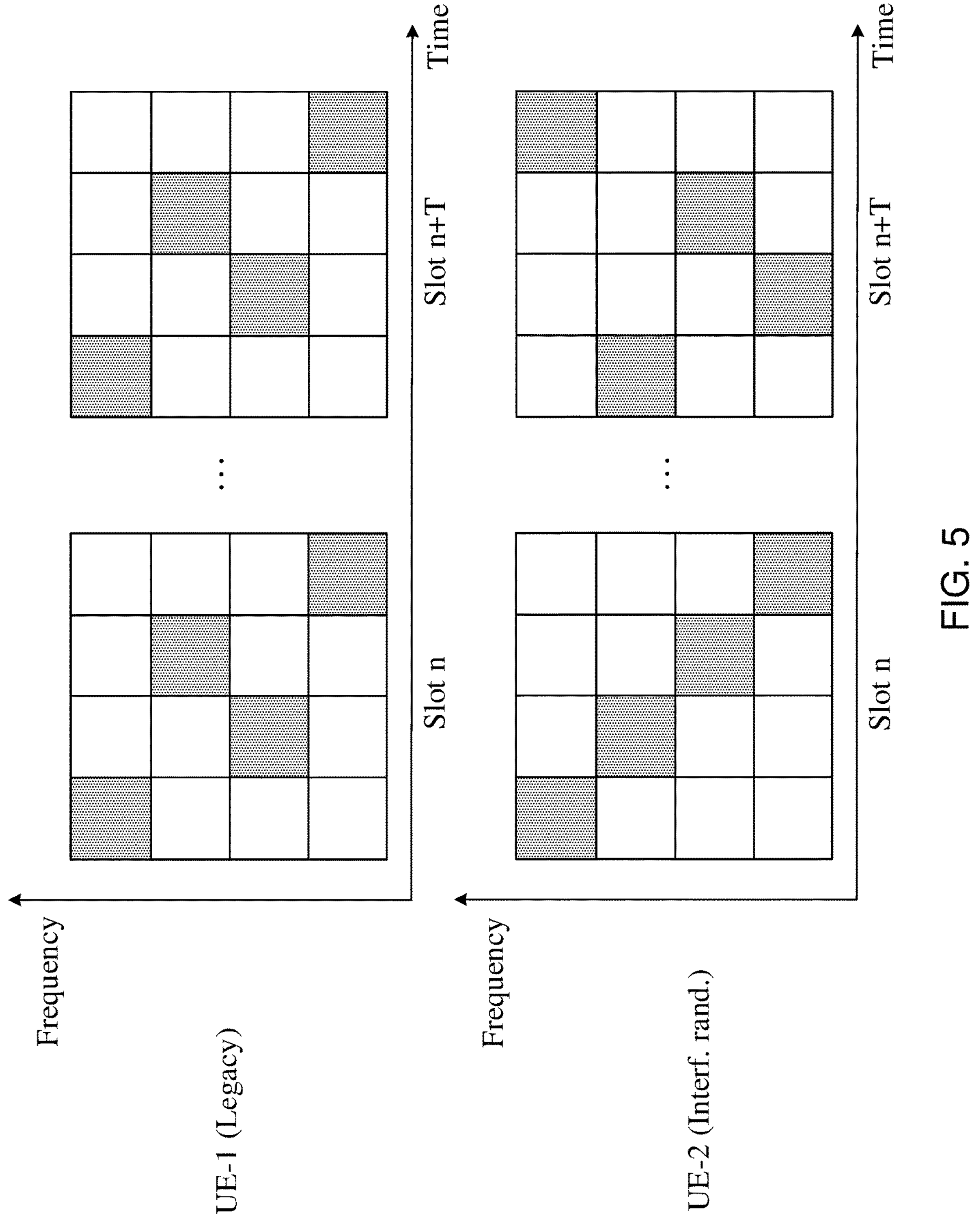
FIG. 5 shows an example SRS frequency hopping where the frequency domain position (e.g., offset) is hopped per frequency hopping period.

In such case, the offset is assumed as 1, and the corresponding diagram for SRS frequency hopping with interference randomization can be found in the FIG. 5. In such case, frequency domain position (e.g., offset) is hopped per frequency hopping period.

In general, some aspects of the technical solutions described in this patent document at least include capacity improvement and interference randomization for SRS transmission, in order to accommodate high-capacity and low-interference requirement for UDN and C-JT/multi-TRP, among other possible scenarios or wireless technologies. Firstly, the mechanisms of TD-OCC and partial frequency hopping can be identified for improving capacity without further resource and sequence consuming. Then, in order to mitigate cross-SRS interference for inter/intra-TRP/cell, interference randomization with some additional hopping schemes (e.g., both sequence and group hopping, each of which has different initialization values) and further flexible hopping schemes (e.g., in terms of sequence, frequency and time domains) as a function of time-domain parameter are proposed. Finally, for having a good backward compatibility, the dynamic switching/activation between different mode (e.g., dynamic switching between interference randomization mode and legacy mode by a DCI command) are considered.

Figure 6:
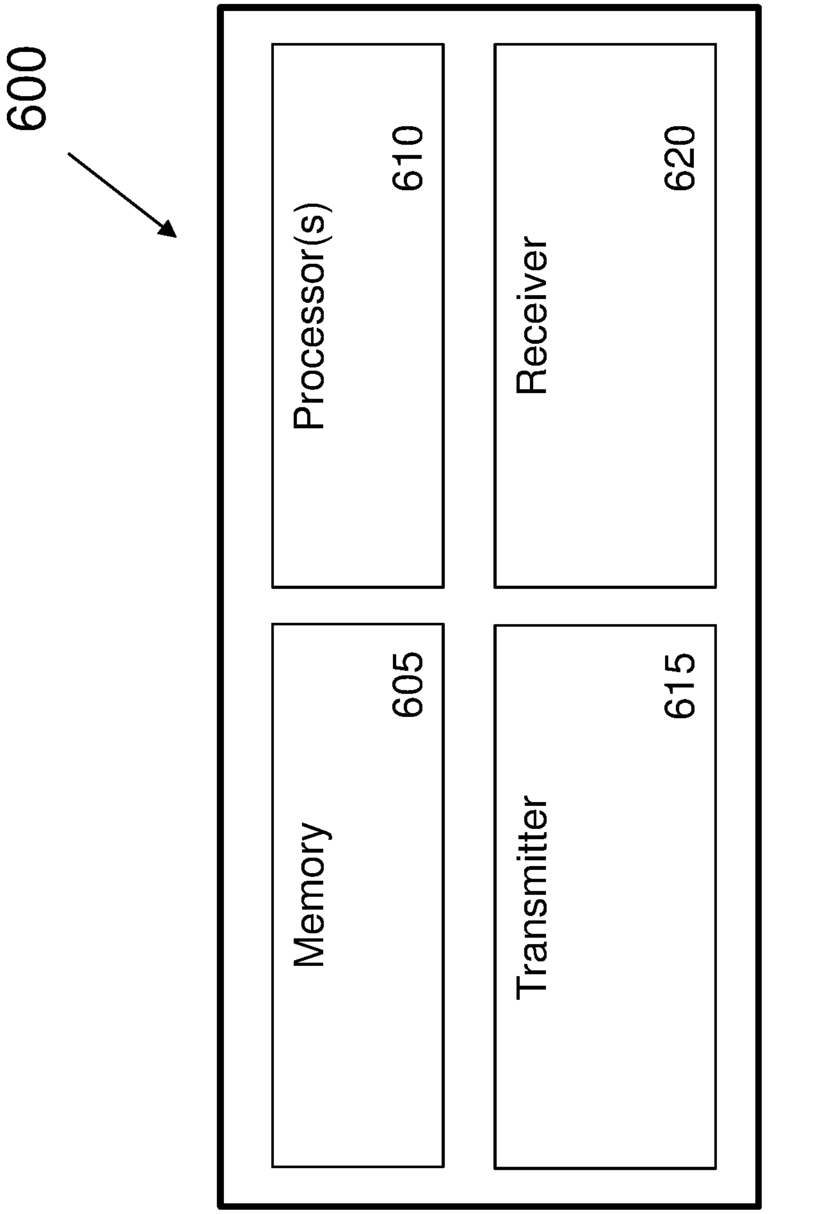
FIG. 6 shows an exemplary block diagram of a hardware platform that may be a part of a network device or a communication device.

FIG. 6 shows an exemplary block diagram of a hardware platform 600 that may be a part of a network device (e.g., base station) or a communication device (e.g., a user equipment (UE)). The hardware platform 600 includes at least one processor 610 and a memory 605 having instructions stored thereupon. The instructions upon execution by the processor 610 configure the hardware platform 600 to perform the operations described in FIGS. 1 to 5 and 7 to 9 in the various embodiments described in this patent document. The transmitter 615 transmits or sends information or data to another device. For example, a network device transmitter can send a message to a user equipment. The receiver 620 receives information or data transmitted or sent by another device. For example, a user equipment can receive a message from a network device.

Figure 7:
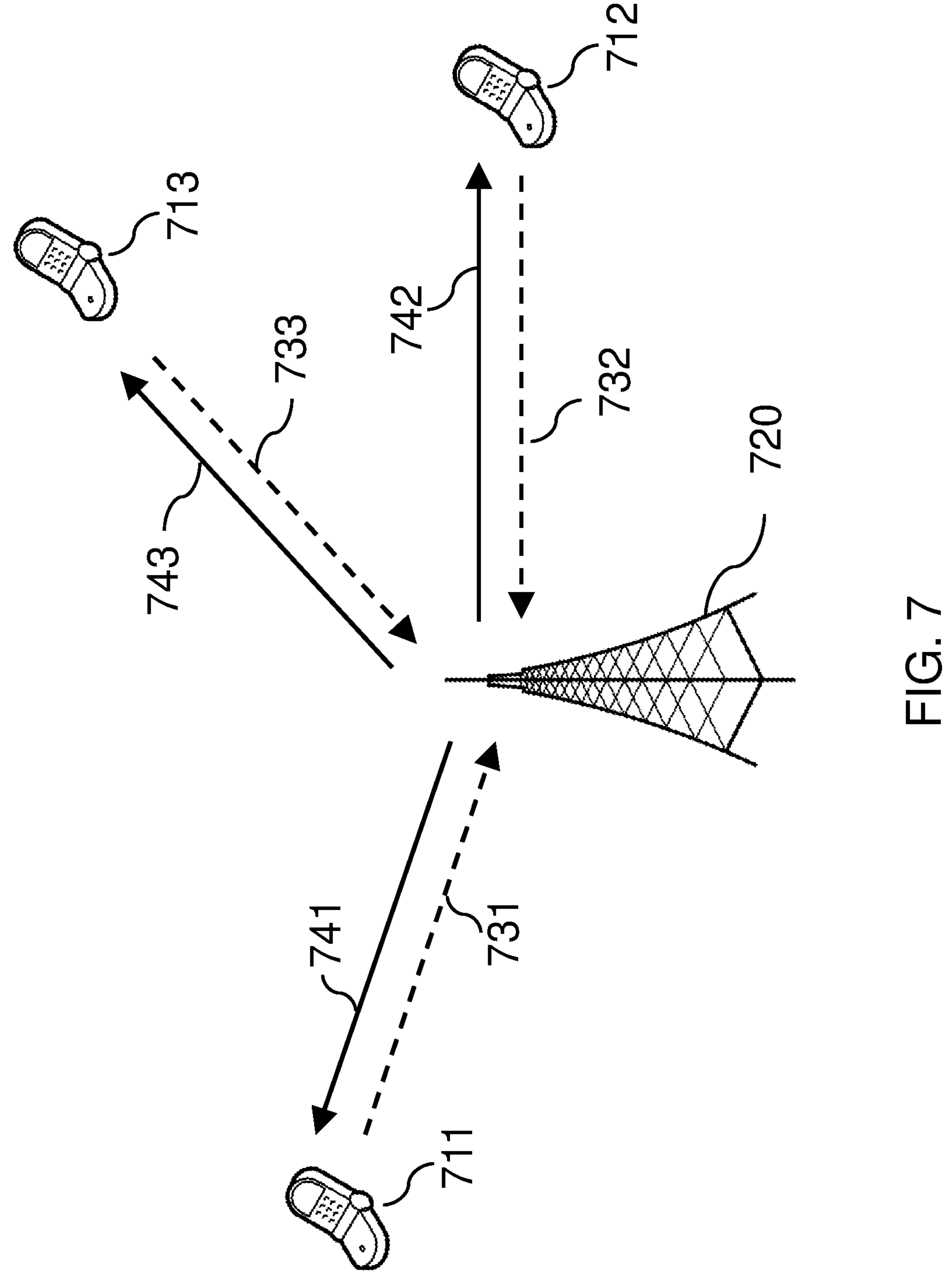
FIG. 7 shows an example of wireless communication including a base station (BS) and user equipment (UE) based on some implementations of the disclosed technology.

The implementations as discussed above will apply to a wireless communication. FIG. 7 shows an example of a wireless communication system (e.g., a 5G or NR cellular network) that includes a base station 720 and one or more user equipment (UE) 711, 712 and 713. In some embodiments, the UEs access the BS (e.g., the network) using a communication link to the network (sometimes called uplink direction, as depicted by dashed arrows 731, 732, 733), which then enables subsequent communication (e.g., shown in the direction from the network to the UEs, sometimes called downlink direction, shown by arrows 741, 742, 743) from the BS to the UEs. In some embodiments, the BS send information to the UEs (sometimes called downlink direction, as depicted by arrows 741, 742, 743), which then enables subsequent communication (e.g., shown in the direction from the UEs to the BS, sometimes called uplink direction, shown by dashed arrows 731, 732, 733) from the UEs to the BS. The UE may be, for example, a smartphone, a tablet, a mobile computer, a machine to machine (M2M) device, an Internet of Things (IoT) device, and so on.

FIG. 8 shows an exemplary flowchart for transmitting SRS. Operation 802 includes transmitting, by a communication device, a sounding reference signal (SRS) using one or more resource elements, where the SRS is determined by the communication device according to one or more parameters.

In some embodiments, a content of the one or more resource elements is determined according to an orthogonal cover code (OCC) function, and each element of the OCC function is determined according to a time-domain index and/or a frequency domain index of the one or more resource elements. In some embodiments, a value for the OCC function is indicated by an OCC parameter, and the OCC parameter is included in a radio resource control (RRC) signaling, is activated via a medium access control-control element (MAC-CE) signaling, or is associated with a beam state. In some embodiments, the OCC parameter applies to one SRS resource or one SRS resource set, or one or more OCC parameters for each SRS resource in a SRS resource are the same, or the OCC parameter is configured by a parameter combination that comprises at least a repetition factor that indicates a number of repetitions of the SRS. In some embodiments, the OCC function applies to resource elements with a same frequency location and corresponding to a plurality of repetitions of the SRS, the OCC function is determined according to a group index that comprises at least one of resource element index, resource block index, or index of a group of one or more resource elements or one or more resource blocks, or a spatial relation or QCL-TypeD is precluded as being applicable.

In some embodiments, the OCC function is disabled in response to a repetition factor being not configured. In some embodiments, an OCC parameter is determined according to a number of symbols of the SRS in response to a repetition factor being not configured. In some embodiments, a transmission power for the SRS within one repetition of the SRS or one OCC function is kept unchanged, the transmission power for the SRS is determined per repetition or per OCC function, a power control parameter associated with the SRS within one SRS repetition or one OCC function is kept unchanged, or a transmission occasion associated with the SRS is determined per SRS repetition or per OCC function. In some embodiments, the transmitting of the SRS is performed according to a partial frequency scaling factor, the partial frequency scaling factor is associated with a frequency hopping pattern from a plurality of patterns, and each of the plurality of patterns indicates a list of one or more frequency offsets. In some embodiments, a step for selecting elements in an order from the list of one or more frequency offsets is 1, or the step for selecting elements in an order from the list of one or more frequency offsets is determined according to the partial frequency scaling factor or is configured.

In some embodiments, in response to the partial frequency scaling factor being equal to 8, and the plurality of patterns include any one or more of: a first pattern with frequency offsets [0, 4, 1, 5, 2, 6, 3, 7], a second pattern with frequency offsets [0, 1, 2, 3, 4, 5, 6, 7], and/or a third pattern with frequency offsets [0, 2, 4, 6, 1, 3, 5, 7]. In some embodiments, in response to the partial frequency scaling factor being equal to 4, and the plurality of patterns include any one or more of: a first pattern with frequency offsets [0, 2, 1, 3], a second pattern with frequency offsets [0, 1, 3, 2], and/or a third pattern with frequency offsets [0, 1, 2, 3]. In some embodiments, the frequency hopping pattern is based on a SRS counter that indicates an index associated with a transmission of the SRS, a number of slots, a symbol index of a symbol associated with the SRS, or a number of symbols associated with the SRS.

In some embodiments, the method further comprises receiving, by the communication device, a radio resource control (RRC) signaling that indicates a mode that indicates both SRS sequence hopping and group hopping. In some embodiments, an initialization value for sequence group and sequence number is determined or configured individually. In some embodiments, an offset for an initialization value for sequence group or sequence number is configured or is predefined. In some embodiments, an initialization value for the SRS is determined according to a SRS related time unit. In some embodiments, the SRS related time unit includes an SRS counter that indicates an index associated with a transmission of the SRS, a number of slots, a symbol index of a symbol associated with the SRS, or a number of symbols associated with the SRS.

In some embodiments, any one or more of following parameters associated with the SRS is determined based on the SRS related time unit: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset. In some embodiments, a sequence group and/or a sequence number for the SRS are determined according to a scaling factor or an offset.

In some embodiments, the scaling factor or the offset are configured per component carrier (CC), per bandwidth part (BWP), per SRS resource set, or SRS resource, the scaling factor or the offset are determined according to beam state, physical cell index (PCI), resource group index, or CORESET pool index, or one or more scaling factors or one or more offsets for one or more SRS resources in a CC, in a BWP or a SRS resource set is the same. In some embodiments, a maximum number of SRS sequence identifier is configured to be more than 1023, or a range of SRS sequence identifier is from 0 to 65535 with a step of 1.

In some embodiments, the method further comprises receiving a downlink control information (DCI) signaling or a medium access control-control element (MAC-CE) signaling that is associated with the one or more parameters that include any one or more of: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset. In some embodiments, the one of the one or more parameter, e.g., an OCC parameter, or both OCC parameter and partial frequency scaling factor is selected from preconfigured pool by the DCI or MAC-CE, and the preconfigured pool comprises a plurality of candidates of the parameter (e.g., an OCC parameter) or parameter combination (both OCC parameter and partial frequency scaling factor). In some embodiments, at least one first parameter of the one or more parameters is selected from a group of one or more first parameters, wherein the group of the one or more first parameters is activated by a MAC-CE or configured by a radio resource control (RRC), or where the one or more parameters is selected from a plurality of the one or more parameters, wherein the plurality of group of the one or more parameters is activated by a MAC-CE or configured by a radio resource control (RRC).

In some embodiments, the initialization value comprises any one or more of a first initialization value for a sequence group and/or a second initialization value for a sequence number. In some embodiments, the offset for the initialization value comprises any one or more of a first offset for the initialization value for a sequence group and a second offset for the initialization value for a sequence number. In some embodiments, the communication device applies the one or more parameters associated with a beam state in response to the beam state being applied a number of time units after an acknowledgement is transmitted by the communication device. In some embodiments, the one or more parameters corresponding to each beam state of a plurality of beam states are applied by communication device in response to the communication device receiving a command that indicates the plurality of beam states.

Figure 9:
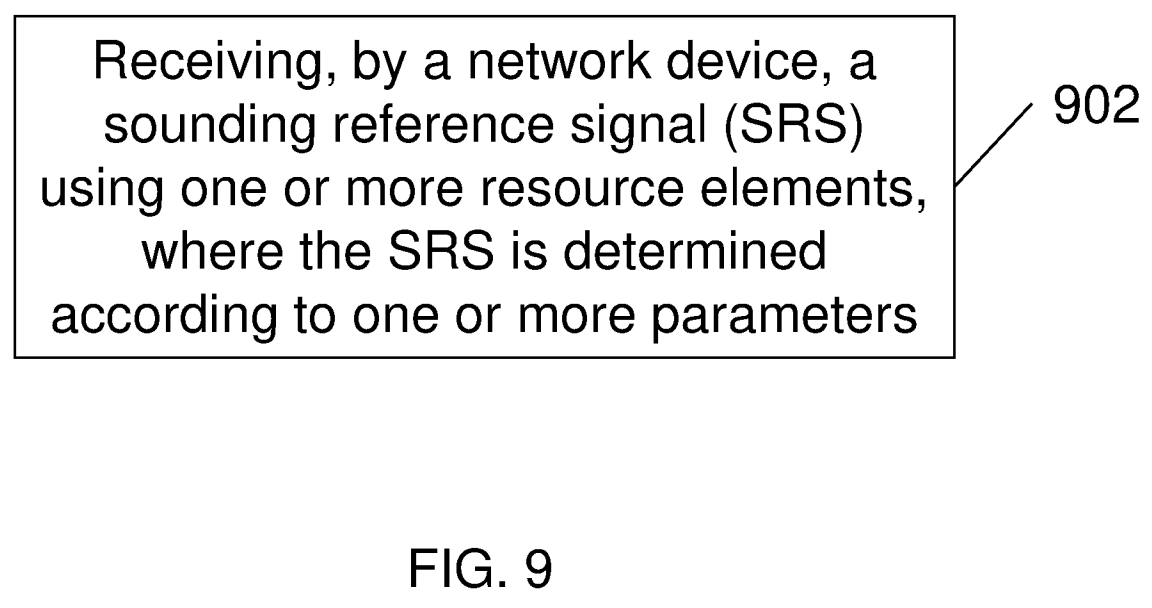

FIG. 9 shows an exemplary flowchart for receiving SRS. Operation 902 includes receiving, by a network device, a sounding reference signal (SRS) using one or more resource elements, where the SRS is determined according to one or more parameters.

In some embodiments, a content of the one or more resource elements is according to an orthogonal cover code (OCC) function, and each element of the OCC function is according to a time-domain index and/or a frequency domain index of the one or more resource elements. In some embodiments, wherein a value for the OCC function is indicated by an OCC parameter, and wherein the OCC parameter is included in a radio resource control (RRC) signaling, is activated via a medium access control-control element (MAC-CE) signaling, or is associated with a beam state. In some embodiments, the OCC parameter applies to one SRS resource or one SRS resource set, or one or more OCC parameters for each SRS resource in a SRS resource are the same, or the OCC parameter is configured by a parameter combination that comprises at least a repetition factor that indicates a number of repetitions of the SRS. In some embodiments, the OCC function applies to resource elements with a same frequency location and corresponding to a plurality of repetitions of the SRS, the OCC function is determined according to a group index that comprises at least one of resource element index, resource block index, or index of a group of one or more resource elements or one or more resource blocks, or a spatial relation or QCL-TypeD is precluded as being applicable.

In some embodiments, the OCC function is disabled in response to a repetition factor being not configured. In some embodiments, an OCC parameter is determined according to a number of symbols of the SRS in response to a repetition factor being not configured. In some embodiments, a transmission power for the SRS within one repetition of the SRS or one OCC function is kept unchanged, the transmission power for the SRS is determined per repetition or per OCC function, a power control parameter associated with the SRS within one SRS repetition or one OCC function is kept unchanged, or a transmission occasion associated with the SRS is determined per SRS repetition or per OCC function. In some embodiments, the receiving of the SRS is according to a partial frequency scaling factor, the partial frequency scaling factor is associated with a frequency hopping pattern from a plurality of patterns, and each of the plurality of patterns indicates a list of one or more frequency offsets. In some embodiments, a step for selecting elements in an order from the list of one or more frequency offsets is 1, or the step for selecting elements in an order from the list of one or more frequency offsets is according to the partial frequency scaling factor or is configured.

In some embodiments, in response to the partial frequency scaling factor being equal to 8, and the plurality of patterns include any one or more of: a first pattern with frequency offsets [0, 4, 1, 5, 2, 6, 3, 7], a second pattern with frequency offsets [0, 1, 2, 3, 4, 5, 6, 7], and/or a third pattern with frequency offsets [0, 2, 4, 6, 1, 3, 5, 7]. In some embodiments, in response to the partial frequency scaling factor being equal to 4, and the plurality of patterns include any one or more of: a first pattern with frequency offsets [0, 2, 1, 3], a second pattern with frequency offsets [0, 1, 3, 2], and/or a third pattern with frequency offsets [0, 1, 2, 3]. In some embodiments, the frequency hopping pattern is based on a SRS counter that indicates an index associated with a transmission of the SRS, a number of slots, a symbol index of a symbol associated with the SRS, or a number of symbols associated with the SRS. In some embodiments, the method further comprises transmitting, by the network device, a radio resource control (RRC) signaling that indicates a mode that indicates both SRS sequence hopping and group hopping.

In some embodiments, an initialization value for sequence group and sequence number is determined or configured individually. In some embodiments, an offset for an initialization value for sequence group or sequence number is configured or is predefined. In some embodiments, an initialization value for the SRS is determined according to a SRS related time unit. In some embodiments, the SRS related time unit includes an SRS counter that indicates an index associated with a transmission of the SRS, a number of slots, a symbol index of a symbol associated with the SRS, or a number of symbols associated with the SRS. In some embodiments, any one or more of following parameters associated with the SRS is determined based on the SRS related time unit: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset.

In some embodiments, a sequence group and/or a sequence number for the SRS are determined according to a scaling factor or an offset. In some embodiments, the scaling factor or the offset are configured per component carrier (CC), per bandwidth part (BWP), per SRS resource set, or SRS resource, the scaling factor or the offset are determined according to beam state, physical cell index (PCI), resource group index, or CORESET pool index, or one or more scaling factors or one or more offsets for one or more SRS resources in a CC, in a BWP or a SRS resource set is the same. In some embodiments, a maximum number of SRS sequence identifier is configured to be more than 1023, or a range of SRS sequence identifier is from 0 to 65535 with a step of 1.

In some embodiments, the method further comprises transmitting a downlink control information (DCI) signaling or a medium access control-control element (MAC-CE) signaling that is associated with the one or more parameters that include any one or more of: a mode that indicates a type of time domain orthogonal cover code (OCC) that is enabled, an OCC parameter that indicates a set of values associated with the type of time domain OCC, a partial frequency scaling factor, a frequency hopping pattern, a step for selecting elements from the list of one or more frequency offsets in a frequency hopping pattern, an initialization value for the SRS, an offset for initialization value for the SRS, a frequency-domain position, a frequency hopping parameter, a SRS sequence identify, an offset for SRS sequence identify, a cyclic shift, and/or a comb offset. In some embodiments, at least one first parameter of the one or more parameters is selected from a group of one or more first parameters, wherein the group of the one or more first parameters is activated by a MAC-CE or configured by a radio resource control (RRC), or where the one or more parameters is selected from a plurality of the one or more parameters, wherein the plurality of group of the one or more parameters is activated by a MAC-CE or configured by a radio resource control (RRC). In some embodiments, the initialization value comprises any one or more of a first initialization value for a sequence group and/or a second initialization value for a sequence number. In some embodiments, the offset for the initialization value comprises any one or more of a first offset for the initialization value for a sequence group and a second offset for the initialization value for a sequence number.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

transmitting, by a communication device, a sounding reference signal (SRS) using one or more resource elements, wherein the SRS is determined by the communication device according to one or more parameters, wherein the transmitting of the SRS is performed according to a partial frequency scaling factor, wherein the partial frequency scaling factor is associated with a frequency hopping pattern from a plurality of patterns, and wherein each of the plurality of patterns indicates a list of one or more frequency offsets.

2. The method of claim 1, wherein a step for selecting elements in an order from the list of one or more frequency offsets is 1, or wherein the step for selecting elements in an order from the list of one or more frequency offsets is determined according to the partial frequency scaling factor or is configured.

3. The method of claim 1, wherein the frequency hopping pattern is based on a SRS counter that indicates an index associated with a transmission of the SRS, a number of slots, a symbol index of a symbol associated with the SRS, or a number of symbols associated with the SRS.

4. The method of claim 1, further comprising:

receiving, by the communication device, a radio resource control (RRC) signaling that indicates a mode that indicates both SRS sequence hopping and group hopping.

5. The method of claim 4, wherein an initialization value for sequence group and sequence number is determined or configured individually.

6. The method of claim 4, wherein an offset for an initialization value for sequence group or sequence number is configured or is predefined.

7. A wireless communication method, comprising:

receiving, by a network device, a sounding reference signal (SRS) using one or more resource elements, wherein the SRS is determined according to one or more parameters, wherein the receiving of the SRS is according to a partial frequency scaling factor, wherein the partial frequency scaling factor is associated with a frequency hopping pattern from a plurality of patterns, and wherein each of the plurality of patterns indicates a list of one or more frequency offsets.

8. The method of claim 7, wherein a step for selecting elements in an order from the list of one or more frequency offsets is 1, or wherein the step for selecting elements in an order from the list of one or more frequency offsets is according to the partial frequency scaling factor or is configured.

9. The method of claim 7, wherein the frequency hopping pattern is based on a SRS counter that indicates an index associated with a transmission of the SRS, a number of slots, a symbol index of a symbol associated with the SRS, or a number of symbols associated with the SRS.

10. The method of claim 7, further comprising:

transmitting, by the network device, a radio resource control (RRC) signaling that indicates a mode that indicates both SRS sequence hopping and group hopping.

11. The method of claim 10, wherein an initialization value for sequence group and sequence number is determined or configured individually.

12. The method of claim 10, wherein an offset for an initialization value for sequence group or sequence number is configured or is predefined.

13. An apparatus for wireless communication comprising a processor configured to implement a method, the processor configured to:

transmit, by a communication device, a sounding reference signal (SRS) using one or more resource elements, wherein the SRS is determined by the communication device according to one or more parameters, wherein the transmit the SRS is performed according to a partial frequency scaling factor, wherein the partial frequency scaling factor is associated with a frequency hopping pattern from a plurality of patterns, and wherein each of the plurality of patterns indicates a list of one or more frequency offsets.

14. The apparatus of claim 13, wherein a step for a selection of elements in an order from the list of one or more frequency offsets is 1, or wherein the step for the selection of the elements in an order from the list of one or more frequency offsets is determined according to the partial frequency scaling factor or is configured.

15. The apparatus of claim 13, wherein the frequency hopping pattern is based on a SRS counter that indicates an index associated with a transmission of the SRS, a number of slots, a symbol index of a symbol associated with the SRS, or a number of symbols associated with the SRS.

16. An apparatus for wireless communication comprising a processor configured to implement a method, the processor configured to:

receive, by a network device, a sounding reference signal (SRS) using one or more resource elements, wherein the SRS is determined according to one or more parameters, wherein the receive the SRS is according to a partial frequency scaling factor, wherein the partial frequency scaling factor is associated with a frequency hopping pattern from a plurality of patterns, and wherein each of the plurality of patterns indicates a list of one or more frequency offsets.

* * * * *